(12) United States Patent
Maarbjerg et al.

(10) Patent No.: US 12,230,998 B2
(45) Date of Patent: Feb. 18, 2025

(54) MULTIPLE OUTPUT ENERGY STORAGE

(71) Applicant: KK Wind Solutions A/S, Ikast (DK)

(72) Inventors: Anders Eggert Maarbjerg, Ulstrup (DK); Dorrit Zenner Torp, Vildbjerg (DK); Lóránd Bede, Herning (DK)

(73) Assignee: KK Wind Solutions A/S, Ikast (DK)

( * ) Notice: Subject to any disclaimer, the term of this patent is extended or adjusted under 35 U.S.C. 154(b) by 0 days.

(21) Appl. No.: 18/245,180

(22) PCT Filed: Sep. 17, 2021

(86) PCT No.: PCT/DK2021/050286
§ 371 (c)(1),
(2) Date: Mar. 14, 2023

(87) PCT Pub. No.: WO2022/057991
PCT Pub. Date: Mar. 24, 2022

(65) Prior Publication Data
US 2023/0361595 A1 Nov. 9, 2023

(30) Foreign Application Priority Data
Sep. 18, 2020 (DK) .......................... PA 2020 70601

(51) Int. Cl.
H02J 9/06 (2006.01)
H02J 7/00 (2006.01)
H02M 7/483 (2007.01)

(52) U.S. Cl.
CPC ............ *H02J 9/062* (2013.01); *H02J 7/0013* (2013.01); *H02J 7/0024* (2013.01);
(Continued)

(58) Field of Classification Search
CPC .... H02J 9/061; H02J 9/062; H02J 9/06; H02J 9/068; H02J 7/0024; H02J 7/0013;
(Continued)

(56) References Cited

U.S. PATENT DOCUMENTS 10,305,298 B2    5/2019   Kristensen
2008/0211308 A1  9/2008   Lin et al.
(Continued)

FOREIGN PATENT DOCUMENTS

EP    2 619 842 A1    7/2013
WO    2019/223845 A1  11/2019

OTHER PUBLICATIONS

International Search Report dated Dec. 13, 2021 issued in PCT/DK2021/050286.
(Continued)

Primary Examiner — Ryan Johnson
(74) Attorney, Agent, or Firm — Lee & Hayes, P.C.

(57) ABSTRACT

The application relates to a high power uninterruptible power supply connected to a stationary electric system. The high power uninterruptible power supply includes an electric cabinet includes a battery string with a controllable current path therethrough including at least one battery module. A first output electrically connected to a first end of the battery string and which is connectable to a first load of the stationary electric system. A second output electrically connected to the battery string so as to facilitate supplying a load with the voltage of at least one battery module. A string controller configured for controlling the current path through the battery string and thereby the voltage level of at least one of the first and second uninterruptible power supply output.

23 Claims, 8 Drawing Sheets

Figure 1A:
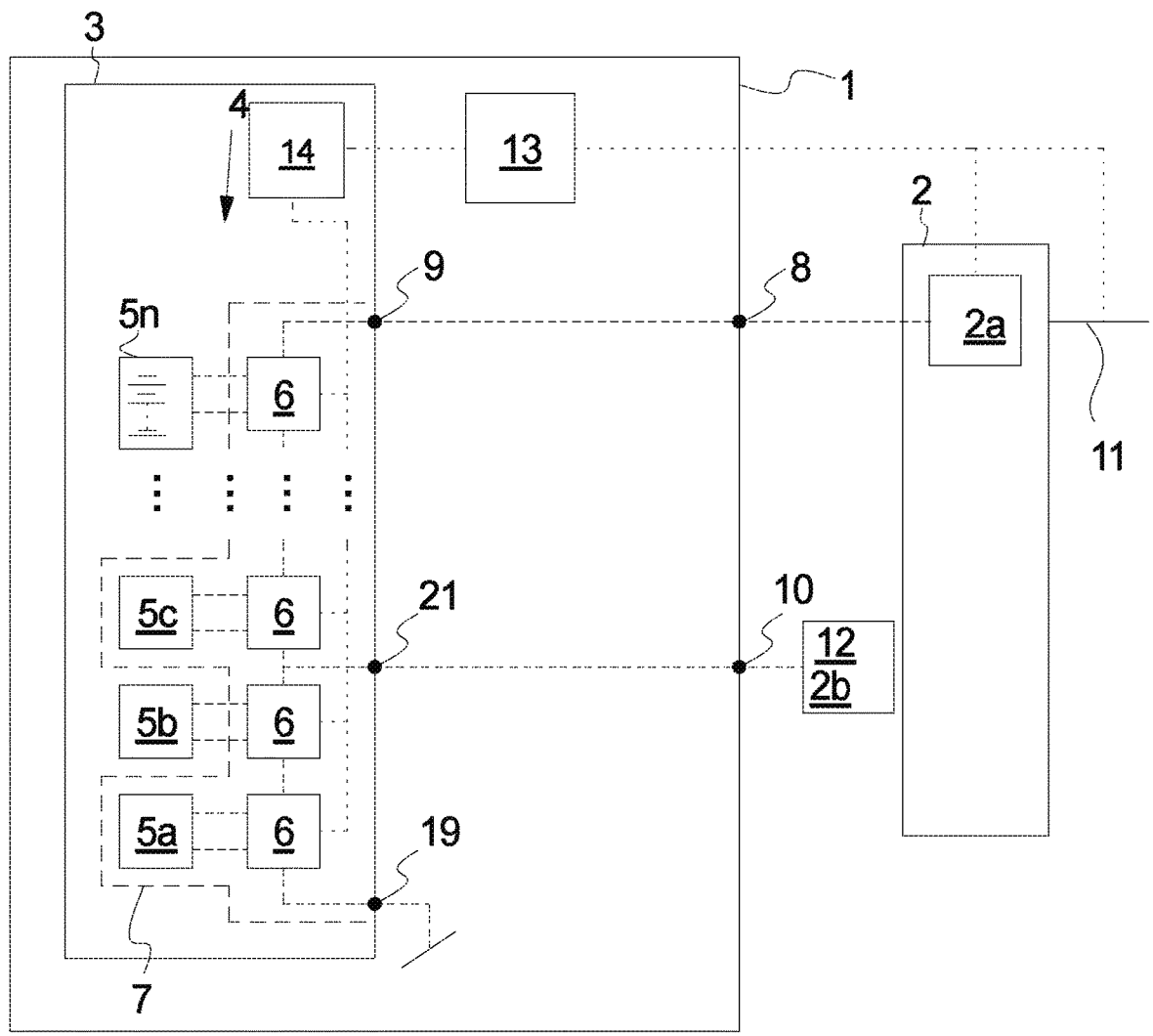

(52) U.S. Cl.
CPC .... *H02J 7/00714* (2020.01); *H02J 7/007182* (2020.01); *H02M 7/483* (2013.01); *Y02B 10/70* (2013.01); *Y04S 10/14* (2013.01); *Y04S 20/12* (2013.01)

(58) Field of Classification Search
CPC ...... H02J 2300/28; Y02B 10/70; Y04S 10/14; Y04S 20/12; H02M 7/483; H01M 2220/10; H01M 10/441; F03D 9/11
See application file for complete search history.

(56) References Cited

U.S. PATENT DOCUMENTS

| | | |
|---|---|---|
| 2010/0225170 A1 | 9/2010 | Hjort et al. |
| 2011/0148195 A1* | 6/2011 | Lee ........................ H02J 7/35 307/25 |
| 2011/0254373 A1* | 10/2011 | Johnson ............... H02M 7/483 307/77 |
| 2012/0256568 A1* | 10/2012 | Lee ......................... B60L 7/26 429/150 |
| 2013/0241472 A1 | 9/2013 | Feuerstack et al. |
| 2014/0002003 A1 | 1/2014 | Kim |
| 2015/0008745 A1 | 1/2015 | Navarro |
| 2015/0236614 A1 | 8/2015 | Schuler et al. |
| 2016/0359329 A1 | 12/2016 | Kim et al. |
| 2017/0317510 A1* | 11/2017 | Banerjee ................ H02J 9/061 |
| 2018/0191194 A1 | 7/2018 | Nakano |
| 2019/0103750 A1* | 4/2019 | Kristensen .......... H01M 10/441 |
| 2020/0119571 A1* | 4/2020 | Taylor, Jr. ............ H02M 3/155 |
| 2020/0207219 A1 | 7/2020 | Slepchenkov et al. |
| 2021/0126468 A1* | 4/2021 | Juang ....................... H02J 3/32 |

OTHER PUBLICATIONS

Written Opinion dated Dec. 13, 2021 issued in PCT/DK2021/050286.
Danish Search Report dated Mar. 19, 2021 issued in Patent Application No. PA 2020 70601.

* cited by examiner

MULTIPLE OUTPUT ENERGY STORAGE

FIELD OF THE INVENTION

The invention relates to an energy storage having one or more battery strings controllable to provide multiple outputs and to a method of establishing a three phased output from the energy storage.

BACKGROUND OF THE INVENTION

A stationary electric system such as a wind turbine is today equipped with several back-up power supplies to ensure emergency power supply to e.g. the auxiliary system.

Back-up power supplies and energy storage system are known in the art and an example hereof is EP2619842 disclosing a controllable energy store used for controlling and supplying electric power to the electric machine. The controllable energy store has n parallel power supply branches, each of which includes at least two serially connected high power uninterruptible power supplies. Each high power uninterruptible power supply comprises at least one electric power cell having an associated controllable coupling unit and is connected to a reference bus and to one respective phase of the electric machine.

Prior art document U.S. Ser. No. 10/305,298 is another example of an energy storage systems using different configurations of switches to control the current in and out of a battery string of an energy storage.

Hence, a problem with the known energy storage systems is a lack of flexibility in controlling output thereof.

SUMMARY OF THE INVENTION

The inventors have identified the above-mentioned problems and challenges related to high power uninterruptible power supplies for stationary electric systems, and subsequently made the below-described invention which increase flexibility in output from the energy storage systems and furthermore may reduce the number of back-up power supplies needed in a stationary electric system.

The invention therefore relates to a high power uninterruptible power supply connectable to a stationary electric system, the high power uninterruptible power supply comprising:

- an electric cabinet comprising a battery string, the battery string comprising a plurality of battery modules each associated individually with a switching arrangement wherein the switching arrangements each comprises four switches configured in an H-bridge and are configured to include the associated battery module in or exclude the associated battery module from the battery string and thereby to establish a current path through the battery string including at least two battery module of the plurality of battery modules,
- a first uninterruptible power supply output electrically connected to a first end of the battery string and which is connectable to a first load of the stationary electric system,
- a second uninterruptible power supply output electrically connected to the battery string so as to facilitate supplying a load with the voltage of at least one battery module,
- a string controller configured to receive a control reference and based thereon configured for controlling the operation state of switches of the switching arrangements and thereby the current path through the battery string and thereby the voltage level and current direction of the first and second uninterruptible power supply output.

Being able to control current direction at the first and second uninterruptible power supply outputs is advantageous in that either two AC loads, two DC loads or one AC load can be connected to the first output and one DC load can be connected to the second output or vice versa. Thereby flexibility in output from the uninterruptible power supply is obtained without the use of additional electric components.

This is advantageous in that it has the effect, that two loads operating at different voltage levels can be supplied either simultaneously or independently from the same high power uninterruptible power supply. Accordingly, one or more UPS (UPS; Uninterruptible Power Supply) can be avoided leading to reduction of cost of the stationary device.

A high power UPS having switching arrangements associated with battery modules is advantageous in that it has the effect, that the switching modules selectively determines which of the battery modules should be included in the current path and thereby the voltage over the battery modules included in the current path. Hence, this voltage (may be referred to as battery string voltage) is as a minimum one battery module voltage and maximum the sum of voltages of all battery modules of the battery string (typically not exceeding 25 modules). The voltage over the battery string may vary in steps of one battery module from minimum (one battery module voltage typically not exceeding 50V) to maximum voltage (the sum of all battery modules of a string).

According to an exemplary embodiment of the invention, the control reference is received by the string controller from a high power uninterruptible power supply controller, configured to receive the control reference from the stationary electric system.

The high power uninterruptible power supply controller may only be needed when the UPS acts as an energy storage and not necessarily as a simple backup power supply. When acting as an energy storage, the power supply controller may not necessarily be a stand alone controller, but could be part of a wind turbine controller. When acting as an energy storage one purpose of the power supply controller is to determine power to be delivered, when to charge battery modules, etc. It should be mentioned, that a power supply controller, no matter the if the UPS acts as an UPS or energy storage may be used to facilitate data logging or higher level control.

According to an exemplary embodiment of the invention, the first and second output are electrically the same output, configured to deliver a first voltage at a first point in time and a second voltage at a second point in time.

This is advantageous in that it has the effect, that during a first period of time, the first voltage such as the maximum battery string voltage or a percentage thereof is the output from the high power uninterruptible power supply and at during a second period of time the second voltage different from the first voltage can be the output from the high power uninterruptible power supply. As an example in a uninterruptible power supply having three phases/battery strings could be mentioned, that during the first period of time, the output could be 400V AC and during the second period of time, the output could be 230V AC.

According to an exemplary embodiment of the invention, the load is supplied from one midpoint between two battery modules and from another midpoint between two battery modules.

This is advantageous in that it has the effect, that the load can be supplied with power e.g. from one battery module and with a neutral/reference potential that is different from the neutral/reference potential of the battery string.

According to an exemplary embodiment of the invention, an isolated power supply is connected in the electric connection between the midpoints and the load.

This is advantageous in that it has the effect, that it is possible to any desired neutral/reference potential including the reference potential of the battery string.

According to an exemplary embodiment of the invention, the first and second output are electrically the same output and physically separated.

This is advantageous in that it has the effect, that two physical cables are connectable to the same electric output. This is furthermore advantageous in that two different output voltages can be established from the high power uninterruptible power supply at the same time.

According to an exemplary embodiment of the invention, a first switching device comprises a first side connected to the first end of the battery string and a second side constitute the first uninterruptible power supply output.

This is advantageous in that it has the effect, that it can be ensured, that the first output can be powered off completely. Further it has the effect, that the powering on/off of the first output can be controlled either automatically by an automatic switch or manually be a manual switch. The switching device may be a circuit breaker, contactor, etc.

According to an exemplary embodiment of the invention, a second switching device comprises a first side connected to the current path between two battery modules and a second side constituting the second uninterruptible power supply output.

As with the first switching device, the second switching device is advantageous in that it allows manual or automatic control of the voltage at the second output.

According to an exemplary embodiment of the invention, the high power uninterruptible power supply controller is configured for controlling the operation state of at least one of the first and second switching devices.

A high power UPS having two controllable outputs is advantageous in that it has the effect, that by controlling the first and second circuits breakers, the high power UPS is able to independently supply two different and independent loads having different nominal voltage. In the situation where the stationary electric system is a wind turbine and where both loads are loads of the wind turbine, the high power UPS of the present invention, can replace one, two or more UPS modules of the wind turbine, thereby reducing cost of the electric system of the wind turbine. An UPS module here should be understood as either/or both of battery pack and commercial UPS.

In the context of the present invention, a stationary electric system could be the utility grid, a renewable energy generator such as a wind turbine and photovoltaic system, a datacenter, a ship and other systems having auxiliary systems that need power and especially backup power. Hence, stationary should be understood as an electric system which during operation does not move nor move the application in which it is mounted. An example of a non-stationary electric system in the context of the present invention is an electric vehicle.

As mentioned, the battery modules are controllable by the switching arrangement i.e. the string controller is configured for controlling the status of switches of the switching arrangement and thereby control if an individual battery module is connected to the current path between the first and second ends of the battery string.

According to an exemplary embodiment of the invention, the first side of the second switching device is connected to the battery string by a direct connection to one battery module.

This is advantageous in that it has the effect, that the load connected to the second side of the second switching device can be powered without being able to control the switching arrangement i.e. without powering the switching module. Thereby is obtained better prerequisite for performing true black start. Where true black start should be understood as starting up the stationary electric system without any external power, power reference, frequency reference or the like. Note that "direct connection" should be understood as by passing the switching arrangement and thereby connected directly to the battery cells of the battery module.

According to an exemplary embodiment of the invention, the load is connected to the second side of the second switching device is one of the high power uninterruptible controller and the string controller.

This is advantageous in that it has the effect, that supplying one or both of these controllers, ensures that black start and true black start can be facilitated.

According to an exemplary embodiment of the invention, the load is a DCDC converter for supplying one of the high power uninterruptible controller and the string controller.

This is advantageous in that it has the effect that it is possible to adjust voltage level to the controller if the battery module voltage is too high.

According to an exemplary embodiment of the invention, the DCDC converter or load is electrically connected directly to one or more the battery modules.

This is advantageous in that standby power consumption is reduced in that switches does not have to be powered in during standby to be able to connect the load/converter to the battery module.

According to an exemplary embodiment of the invention, the second switching device is manually controllable.

This is advantageous in that it has the effect, that the load connected to the second side of the second switching device does not use standby power from the battery module(s) to which it is connected and thereby does not slowly discharge the battery module(s).

According to an exemplary embodiment of the invention, the high power uninterruptible power supply further comprises a separate uninterruptible power supply for supplying the string controller.

This is advantageous in that such separate uninterruptible power supply can then be used to supply the switching devices and thereby the first step in black start of the high power uninterruptible power supply.

According to an exemplary embodiment of the invention, the second side of the second switching device is connectable to a second load of the stationary electric system.

It should be mentioned, that in this embodiment, the load denoted 12 above could be similar to the load of the stationary electric system denoted 2b i.e. this load could be a controller of a wind turbine. With this said, the load denoted 12 does not have to be part of the/of the same stationary electric system as the load denoted 2a.

According to an exemplary embodiment of the invention, the first and second switching devices are located in an interface cabinet.

Placing the switching devices in an interface cabinet is advantages in that it has the effect, that the battery string cabinet can be designed and manufactured completely similar. The reduced complexity in handling components and logistics of the panels in that the same battery string cabinets can be used on different sites. If a high power UPS is required to comprise several battery strings cabinets e.g. to increase number of phases or capacity in one phase, then first when mounted on site, the similar battery string cabinets are assigned to a particular phase, group of battery modules, string or the like. Further, more of the high power uninterruptible power supply can be mounted at a mounting facility reducing workhours spend on site.

Note that the high power uninterruptible power supply may comprise three battery strings. Having three battery strings is advantageous in that it has the effect, that a three phases first uninterruptible power supply output can be established. Hence, the high power uninterruptible power supply can supply three phased loads of the stationary electric system.

According to an exemplary embodiment of the invention, the high power uninterruptible power supply comprises three electric cabinets, each of which comprises one of the three battery strings.

This is advantage in that it has the effect, that it increases the volume available for battery modules of a battery string. Increasing the number of battery modules either increase the possible peak voltage (and thereby RMS voltage) and/or allows installation of back up battery modules in a battery string. Backup modules may be used to extent life time of the battery modules of the battery string, be used if a battery module fails, used to supply the second uninterruptible power supply output, etc.

It should be mentioned, that for minor systems, the three strings may be located in one electric cabinet. This has the effect, that footprint is reduced and cost of additional electric cabinets are eliminated. However, introducing three strings into one electric cabinet has the drawback, that it reduced the number of battery modules each battery string can comprise and thereby the peak voltage of a string leading to a reduce RMS voltage possible to deliver from the battery string.

According to an exemplary embodiment of the invention, the string controller of each battery string is configured to control the switching arrangement and thereby the current path through the battery modules within the associated battery strings so that the RMS voltage between poles of the first switching device is 400V±10% and wherein the RMS voltage between the pole of the second switching devices and ground potential is 230V±10%.

According to an exemplary embodiment of the invention, the string controller is configured to control the battery modules within the associated battery string so that the RMS voltage between the pole of the second switching devices and ground potential is between 0V and 230V.

This is advantageous in that it has the effect that the high power uninterruptible power supply can supply the second load of the stationary electric system with a voltage in the range of 50V to 230V. The voltage possible to establish is determined by the voltage of the individual battery modules and hence increases stepwise with a level corresponding to the voltage level of a battery module. Note that any voltage can be established from the UPS and the above examples are only those that are most relevant in Europe. Typically, it is required to deliver the a certain voltage within a range of ±10%.

The voltage may be below a battery module voltage is the switches and thereby the voltage are controlled according to Pulse Wide Modulation principles. Voltage below a battery module voltage may requires additional components such as filters.

According to an exemplary embodiment of the invention, the string controller of at least one of the three battery strings is configured to connect the second end of the battery string to the second ends of the second and third battery strings during one period of time and disconnect the second end of the battery string from the other second ends during another period of time.

This is advantageous in that it has the effect, that during the one period of time, the high power uninterruptible power supply is capable of delivering e.g. a 400V AC output and during the other period of time, the high power uninterruptible power supply is capable of delivering e.g. a 230V AC.

Hence, the neutral/reference potential of the second end of the battery strings when the high power uninterruptible power supply delivers a three phased output voltage of e.g. 400 VAC is different from the neutral/reference potential of the single phase during the period of time when that single phase delivers its second output voltage of e.g. 230 VAC.

According to an exemplary embodiment of the invention, the three battery strings are configured for supplying one three phased load and one single phased load simultaneously.

According to an exemplary embodiment of the invention, the string controller of a battery string supplying the single phased AC load is configured to, together with the string controller of a battery string taking over the supply are configured to control the battery string swap according to the following steps: starting the up the battery string, synchronizing the output voltage of the two battery strings, connecting the battery string to the AC load, and disconnecting the battery string from the AC load.

This is advantageous in that it has the effect, that a smooth phase swap is facilitated protecting the load. The load may be any type of load including a commercial uninterruptible power supply.

As mentioned, the switching arrangement may comprise four semiconductor switches in a H-bridge configuration.

This is advantageous in that it has the effect, that the string controller, by controlling the semiconductor switches, can bypass one or more battery modules.

According to an exemplary embodiment of the invention, the string controller is configured to control switching of the four semiconductors of each of the switching arrangement in the battery string and thereby the series connection of the battery modules in a battery string autonomously based on the control signal received from the uninterruptible power supply controller.

This is advantageous in that it has the effect, that the uninterruptible power supply controller on a top level can control the current flow into or out of the high power uninterruptible power supply. Whereas it is the string controller which, for its associated battery string, which is controlling which of the battery modules of the battery string that should be included to reach the references or control signals received from the uninterruptible power supply controller.

According to an exemplary embodiment of the invention, the current path is established by the switching arrangements which each is configured to selectively connect or by-pass its associated battery module from the current path.

This is advantageous in that it has the effect, that the faulty modules can be bypassed while the remaining modules of the battery string can continue in operation and thereby continue the battery string in operation.

According to an exemplary embodiment of the invention, the high power uninterruptible power supply is configured to deliver a first output voltage at the first uninterruptible power supply output simultaneously with a second output voltage at the second uninterruptible power supply output, wherein the first output voltage is generated by at least two battery modules from the battery string and the second output voltage is generated by at least one battery module of the battery string.

This is advantageous in that it has the effect, that loads connected to the UPS operating at different voltages can be supplied simultaneously. Hence if one battery module in a battery string is 50V, then the second output may be a 50V output based on one battery module and the first output may be 100V based on two battery modules.

According to an exemplary embodiment of the invention, the string controller is configured for individually controlling on-time of the battery modules and thereby voltage at and/or current contribution from the individual battery modules to the first and/or second uninterruptible power supply outputs.

On-time should be understood as the time the switches are conducting thereby connecting its associated battery module to the battery string thereby allowing the battery module to be charged or discharged.

Such on-time control is advantageous in that freedom in types of loads connectable to the first and second outputs are obtained i.e. a flexible uninterruptible power supply with flexible output is provided with no requirements to additional components such as diodes when connecting a load (a load may draw current from or push current back to the battery string) to the second uninterruptible power supply output.

According to an exemplary embodiment of the invention, when a first load is connected to the first uninterruptible power supply output and a second load is connected to the second uninterruptible power supply output, the string controller is controlling the on-time of battery modules only contributing to supply the first load according to a voltage compensating mode.

Voltage compensation mode should be understood as controlling the switches so as to connect the battery modules to the string different in terms of polarity. Hence, the polarity of battery modules supplying a load connected to the second uninterruptible power supply output may be different from the polarity of battery modules only supplying a load connected to the first uninterruptible power supply output. It should be noted that battery modules supplying a load connected to the second uninterruptible power supply output may also at least partly supply a load connected to the first uninterruptible power supply load.

According to an exemplary embodiment of the invention, the voltage compensating mode include, based on knowledge of battery module voltage and current of the first and/or second uninterruptible power supply output, controlling the operation state of switches of the switching arrangements associated with battery modules located in the battery string between the second end of the battery string and a midpoint to have a different polarity than battery modules located in the battery string between the first end of the battery string and the midpoint.

Knowledge of battery module voltage may be obtained from voltage measurements or from knowledge of the individual battery module design (i.e. number and voltage of the individual battery cells of the individual battery modules) and historic used of individual battery modules possessed by the string controller. The string controller keeps track of use of the individual battery modules and thereby of the battery module voltage and because the string controller knows when the individual modules are connected to the string and thereby contributing to the string measured at the first and/or second outputs, the string controller is able to calculate representations of voltage of the individual battery modules such as the battery module voltage.

Knowledge of current may be established from any type of current sensor/current measurement method known to the skilled person. Sensor readings of current may be made anywhere from the midpoint connection between two battery modules to the load connected to the second uninterruptible power supply output.

The midpoint being defined anywhere from the electric connection between two battery modules and the second uninterruptible power supply output.

According to an exemplary embodiment of the invention, when a first load is connected to the first uninterruptible power supply output and a second load is connected to the second uninterruptible power supply output, wherein the second load is a DC load, the string controller is controlling the battery modules contributing to supply of the second load with a constant polarity.

The constant polarity is preferably positive and determined in accordance with the requirements from the connected DC load.

According to an exemplary embodiment of the invention, when a first load is connected to the first uninterruptible power supply output and a second load is connected to the second uninterruptible power supply output, wherein the first load is a DC load and the second load is an AC load, the string controller is controlling the battery modules contributing to supply of the first load according to the voltage compensation mode.

According to an exemplary embodiment of the invention, when a first load is connected to the first uninterruptible power supply output and a second load is connected to the second uninterruptible power supply output, wherein the first load is an AC load and the second load is an AC load, the string controller is controlling the battery modules contributing to supply of the first load and the battery modules contributing to supply both the first and the second load are synchronized.

Synchronization should be understood as in this case the two AC loads are supplied with AC voltages in phase and having same frequency.

According to an exemplary embodiment of the invention, the second uninterruptible power supply output is connected to a switching arrangement.

According to an exemplary embodiment of the invention, the first load or the second load is an electric charger.

Preferably the charging current is a DC current in that it makes control of the battery modules easier if at the same time the other load is an AC load. However, it should be noted, that if two chargers are connected, these can be both AC, DC or one can be an AC and the other a DC charger.

Note that the first output voltage may be an AC voltage and the second output voltage is a DC voltage. Generating both AC and DC voltage from the same battery string is advantageous in that it has the effect, that the areas and flexibility of use of the UPS are increased and one UPS according to the present invention can replace one AC and one DC UPS leading to reduction in cost and system design complexity.

According to an exemplary embodiment of the invention, the interface cabinet comprise a first additional switching device configured to connect the second battery string to the first uninterruptible power supply output.

According to an exemplary embodiment of the invention, the interface cabinet comprise a second additional switching device configured to connect the third battery string to the first uninterruptible power supply output.

This is advantageous in that it has the effect, that simultaneously with establishing a three phased output at the second uninterruptible power supply output, based on one phase from each of the three battery strings, it is possible to selectively connect the first uninterruptible power supply output to each individual of the three battery strings. Further, it is possible to switch between which of the individual battery strings that is connected to the first uninterruptible power supply output. This has the effect, that if one battery string or if it is predicted that one battery string is not able to continue supplying the one phased output, it is possible for the uninterruptible power supply controller to change the supply thereof to another of the battery strings. Which of the battery strings that are preferred as new power supply may be determined based on information of state of charge/state of health of the battery strings from the respective battery string controllers. Further, temperature of battery module(s) or inside cabinet may be used as bases for selecting which battery string to use. Hence, often it would be preferred to use to cabinet/modules that has the lowest temperature.

According to an exemplary embodiment of the invention, the string controller controlling the individual battery string connected to either the first uninterruptible power supply output or the second uninterruptible power supply output is configured to establish an AC or a DC voltage on the first and second uninterruptible power supply outputs.

This is advantageous in that it has the effect, that the high power uninterruptible power supply is able to supply both types of AC or DC loads. To achieve this, the string controller(s) are programmed to control the switching arrangements so as to establish the desired output type.

According to an exemplary embodiment of the invention, the first ends of each of the three battery strings are electrically connected to the first side of the first switching device of the interface cabinet.

Providing electric connections by means of cables or busbars from the electric cabinet(s) to the interface cabinet and inside the interface cabinet connect the electric connections to the first side of the first switching device is advantageous in that it has the effect, that one multi pole switching device can be used instead of a plurality of single pole switching devices.

According to an exemplary embodiment of the invention, the high power uninterruptible power supply is configured to deliver a three phased output voltage via the first uninterruptible power supply output simultaneously with a one phased output voltage via the second uninterruptible power supply output, wherein the three phased output voltage is generated by at least one battery module from each of the three battery strings and the one phased output voltage is generated by at least one battery module from one of the three battery strings.

This is advantageous in that it has the effect, that loads of the stationary system or other loads connected to the UPS operating at different voltages can be supplied from the same uninterruptible power supply. Thereby the electric system of the stationary system is simplified in that one or more uninterruptible power supplies can be removed which in addition also reduces the costs of the electric system. It should be noted, that the second output may also be three phased and the first output may also be a single phase.

According to an exemplary embodiment of the invention, the interface cabinet comprises switching devices the status of which determines which of the three battery strings that is connected to the second uninterruptible power supply output, wherein the breakers is controlled by the high power uninterruptible power supply controller.

This is advantageous in that it has the effect, that the power needed to supply a load connected to the second output can be distributed between two or three phases depending on the number of breakers.

According to an exemplary embodiment of the invention, the second ends of each of the three battery strings are electrically connected in a star point inside the interface cabinet, and wherein the star point is connected to ground potential.

Connecting the three second ends of the battery strings to ground potential is advantageous in that it has the effect, that ground potential is becomes common reference potential for each of the three phases in the electric system. Further, it is advantageous when connecting to a stationary electric system which also use ground potential as reference potential.

According to an exemplary embodiment of the invention, the start point is connected to the first side of the first switching device.

In addition, it may be possible to connect the start point to the first side of the first switching device if the first load of the stationary electric system requires the zero potential. Doing so has the effect, that it is ensured, that the zero connector can also be turned off and thus all three phases and the zero connector to the first load at the stationary electric system can be opened/turned off ensuring than no currents in the zero conductor can be present.

According to an exemplary embodiment of the invention, the high power uninterruptible power supply comprises a third switching device, a first side of which is connected to a midpoint between two battery modules of one battery string and a second side of the third switching device constitutes a third uninterruptible power supply output which is connected to a third load, and wherein the first side of the third switching device is connected to the one battery string between the battery module of the battery string which is second closest to the second end of the battery string and the battery module that is third closest to the second end of the battery string.

Connecting the third switching device to the midpoint, i.e. anywhere in the electric connection between the second and third battery modules closest to the second end of the battery system is advantageous in that it has the effect, that the third uninterruptible power supply output can supply a voltage corresponding to the voltage over two battery modules.

According to an exemplary embodiment of the invention, the first uninterruptible power supply output is connected to each of the three battery strings, wherein the second uninterruptible power supply output is connected to a first of the three battery strings and wherein a third uninterruptible power supply output is connected to a second of the three battery strings.

This is advantageous in that it has the effect, that the high power uninterruptible power supply is capable of supply three different loads of the stationary electric system.

According to an exemplary embodiment of the invention, a first side of the second switching device is connected to a midpoint between two battery modules of the battery string.

This is advantageous in that it has the effect, that the second uninterruptible power supply output voltage can be any voltage between the voltage over one battery module and the voltage over a series connection of all battery modules in the battery string minus one battery module voltage.

According to an exemplary embodiment of the invention, the second load of the stationary electric system connected to the second uninterruptible power supply output is one phased load selected from the list comprising: a controller, a motor drive, a motor and light systems.

According to an exemplary embodiment of the invention, the first side of the second switching device is connected to one of the battery strings between the battery module of the one battery string which is closest to the second end of the one battery string and the battery module that is second closest to the second end of the battery string.

Connecting the second switching device to the midpoint, i.e. anywhere in the electric connection between the two battery modules closest to the second end of the battery system is advantageous in that it has the effect, that the second uninterruptible power supply output can supply a minimum voltage corresponding to the voltage over one battery module.

According to an exemplary embodiment of the invention, the one battery string connected to the second switching device comprises more battery modules than the other battery strings in the high power uninterruptible power supply.

This is advantageous in that it has the effect, that the additional battery modules can be used as one phased supply and thereby the one battery string is able to deliver its part of the three phased output as the remaining two battery strings.

According to an exemplary embodiment of the invention, the first load of the stationary electric system connected to the first uninterruptible power supply output is a three phased load of a wind turbine selected from the list comprising yaw motor, pitch motor, motor drive, lubrication system, breakers, cooling, control systems and heating systems.

Connecting the first load to the first uninterruptible power supply output is advantageous in that it has the effect, that it can be operated even if the main supply is not connected to the load. Again, in case the stationary load is a wind turbine, this enables the nacelle to yaw, blades to pitch, etc.

According to an exemplary embodiment of the invention, the battery strings is controlled so as to increase and decrease voltage at the first output so as to control a motor connected to the first output directly.

This is advantageous in that it has the effect, that the motor drive at the stationary load can be omitted in that the frequency/voltage regulation performed by such motor drive can be performed by the string controllers of the UPS.

According to an exemplary embodiment of the invention, the second switching device is controllable independent of the first switching device by the uninterruptible power supply controller.

This is advantageous in that it has the effect, that a one phased load such as a wind turbine control system can be supplied while a three phased load such as a yaw motor is not supplied and vice versa.

According to an exemplary embodiment of the invention, the interface cabinet and the electric cabinet are comprised in the same electric panel.

Preferably the electric cabinet and the interface cabinet are two independent electric cabinets, however if size and weight of battery modules, breakers, etc. allows the elements of the electric cabinet and the interface cabinet could be mounted in one and the same panel.

According to an exemplary embodiment of the invention, the interface cabinet and/or the electric cabinet comprises lifting points configured for moving the cabinets.

This is advantageous in that it has the effect, that one part such as a battery string cabinet can be used at a first site and later on, at a second site. Further it has the effect, that it can substitute e.g. a diesel generator used to ensure yawing and pitching capabilities of a wind turbine during long term disconnection from the grid. This is possible because the first interface cabinet is configured to supply electric motors and the second interface cabinet is configure to supply controllers of the wind turbine.

According to an exemplary embodiment of the invention, the high power uninterruptible power supply is configured to supply power to one or both of the first and second loads of the stationary electric system, wherein the stationary electric system is a wind turbine.

Connecting a high power uninterruptible power supply to a wind turbine prior to grid connection is advantageous in that it has the effect, that the auxiliary system and other independent loads of the wind turbine can be supplied with power from a battery in contrary to today, where e.g. the wind turbine controller is powered from a diesel generator.

According to an exemplary embodiment of the invention, the high power uninterruptible power supply comprises at least one electrical cabinet comprising a battery string which is permanently mounted in the stationary electric system and at least one electric cabinet comprising a battery string which is temporally mounted in the stationary electric system.

This is advantageous in that it has the effect, that an electric cabinet can easily be replaced or battery modules of at least the temporally electric system can easily be replaced during periods where the stationary electric system is not grid connected. Hence it can be ensured that the stationary electric system can be supplied with necessary power e.g. by changing battery modules or electric cabinet.

According to an exemplary embodiment of the invention, three electric cabinets each comprising a battery string are installed in a container.

This is advantageous in that it has the effect, that the high power uninterruptible power supply (1) then can be easily moved from site to site. This is especially true if the outputs from the electric cabinets are easy to access e.g. from lead-ins through the container or connection points such as sockets or terminals.

According to an exemplary embodiment of the invention, the high power uninterruptible power supply is installed in a wind turbine prior to establishing an electric connection between the wind turbine and a utility grid.

This is advantageous in that it has the effect, that the wind turbine can be powered up and thereby tested, yaw and pitch controlled according to wind speed and direction, etc. All this without using a temporary power generator such as a diesel generator making the erection of the wind turbine more climate friendly.

According to an exemplary embodiment of the invention, the battery modules of the high power uninterruptible power supply are replaceable and wherein at least part of the battery modules of the high power uninterruptible power supply prior to grid connection of the wind turbine are second hand battery modules replaceable with new battery modules upon grid connection of the wind turbine.

This is advantageous in that it has the effect, that the capacity loss of battery modules due to use as supply for the wind turbine during a long term grid disconnection such as a period prior to grid connection (maybe 3-6 months while the wind turbine is under construction) is high. A battery is intended to be replaced when its capacity is 70% of full capacity. Up to 50% of the 30% reduction of capacity may occur from a long-term grid disconnection. Accordingly there is a large capacity reduction of battery modules during such periods of time which is avoided to new battery modules if old are used prior to grid connection. Further this is advantageous in that it has the effect, that old "70% capacity" battery modules can be used and not discharged leading to a better environmental foot print of the battery module lifecycle.

Upon grid connection should be understood as just before or just after connection of the wind turbine to the utility grid.

According to an exemplary embodiment of the invention, the high power uninterruptible power supply is temporary connected to wind turbine.

This is advantageous in that it has the effect that the UPS may be comprised by a container which can be moved to the site of the wind turbine where it may serve as temporary power supply for the wind turbine prior to grid connection. The power from such temporary UPS may be used e.g. during test or alignment into the wind.

According to an exemplary embodiment of the invention, the stationary electric system is a wind turbine, datacenter or a photovoltaic power generator.

This is advantageous in that it has the effect, that both three phased motors and single phased control systems can use the energy storage system as backup power supply.

According to an exemplary embodiment of the invention, the battery modules of the high power uninterruptible power supply are replaced when the capacity thereof is less than 50%, preferably less than 75%, most preferably less than 70%.

This is advantageous in that it has the effect, that in this way full capacity of the high power uninterruptible power supply can be maintained.

According to an exemplary embodiment of the invention, a controller of the stationary electric system is configured to provide a control reference signal to the high power uninterruptible power supply controller based on which the high power uninterruptible power supply controller is configured for controlling the status of at least one of the first and second switching devices.

This is advantageous in that it has the effect, that power to the loads of the stationary electric system can be controlled by the controller of the stationary electric system.

According to an exemplary embodiment of the invention, the high power uninterruptible power supply controller is configured for measuring a control reference signal at a high voltage electric system, wherein the high voltage system is the utility grid.

Advantageous in that even if a controller of the high voltage electric system is switched off, the high power uninterruptible power supply controller is able to receive information of the high voltage electric system including the returning of grid and thereby facilitate power for powering up the high voltage electric system including controllers thereof.

According to an exemplary embodiment of the invention, the high power uninterruptible power supply controller is connected to at least one of a voltage sensor and current sensor, wherein the voltage sensor and current sensor is configured to measure voltage and current respectively in the connection of the stationary electric system and the utility grid.

This is advantageous in that it has the effect, that the high power uninterruptible power supply controller autonomously and independent of the stationary electric system is able to power on i.e. to perform black start of the stationary electric system e.g. when a lost grid connection is re-established.

Moreover, the invention relates to a high power uninterruptible power supply system comprising a stationary electric system and a high power uninterruptible power supply, the system comprising:
- at least one electric cabinet comprising a battery string, the battery string comprising a plurality of battery modules each associated individually with a switching arrangement wherein the switching arrangements each comprises four switches configured in an H-bridge and are configured to include the associated battery module in or exclude the associated battery module from the battery string and thereby to establish a current path through the battery string including at least two battery module of the plurality of battery modules,
- a first uninterruptible power supply output electrically connected to a first end of the battery string and which is connectable to a first load of the stationary electric system,
- a second uninterruptible power supply output electrically connected to the battery string so as to facilitate supplying a load with the voltage of at least one battery module,
- a string controller configured to receive a control reference and based thereon configured for controlling the operation state of switches of the switching arrangements and thereby the current path through the battery string and thereby the voltage level and current direction of the first and second uninterruptible power supply output.

According to an exemplary embodiment of the invention, the system implements a high power uninterruptible power supply.

Moreover, the invention relates to a method of establishing a three phased AC output voltage of a high power uninterruptible power supply comprising a first, second and third battery string, each of the battery strings comprising a plurality of battery modules the inclusion of which in a current path through one of the battery strings is controlled by a switching arrangement comprising four switches in an H-bridge configuration, and wherein the switching arrangements of one battery string is controlled by a string controller,
the method comprising the steps of:
- by a first battery string controller, controlling switches of the switching arrangements of the first battery string according to frequency and voltage references thereby establishing a first phase AC output voltage of the first battery string,
- by a second battery string controller establish a measurement of the first phase AC output voltage and establish a second phase AC output voltage displaced with 120 degrees compared to the first phase AC output voltage, by controlling the switches of the switching arrangement of the second battery string, and
- by a third battery string controller establish a measurement of the first or second phase AC output voltage and establish a third phase AC output voltage displaced with 120 degrees compared to the first and to the second phase AC output voltage, by controlling the switches of the switching arrangement of the third battery string.

This is advantageous in that it has the effect, that the high power uninterruptible power supply is able to start up and establish a three phased AC energy storage system without any external voltage or frequency reference. Thereby is obtained a high power uninterruptible power supply facilitating true black start of a stationary electric system such as a wind turbine without grid connection.

According to an exemplary embodiment of the invention, the method is implemented in a high power uninterruptible power supply.

According to an exemplary embodiment of the invention, the voltage and frequency references are pre-programmed into software of the first string controller or are provided to the first string controller from a high power uninterruptible power supply controller.

According to an exemplary embodiment of the invention, the string controller is controlling the four switches of each of the switching arrangement in the associated battery string and thereby the series connection of the battery modules in the associated battery string autonomously based on the control signal received from the uninterruptible power supply controller and measurements performed at the individual battery modules.

This is advantageous in that it has the effect, that the uninterruptible power supply controller on a top level can control the current flow into or out of the high power uninterruptible power supply. Whereas it is the string controller which, for its associated battery string, which is controlling which of the battery modules of the battery string that should be included to reach the references or control signals received from the uninterruptible power supply controller.

According to an exemplary embodiment of the invention, a load is disconnected from the high power uninterruptible power supply when the three phased AC voltage output is established and wherein the load is connected to the high power uninterruptible power supply by means of switching device after the three phased AC voltage output is established.

According to an exemplary embodiment of the invention, the connection of the load to the high power uninterruptible power supply is made by ramping up the three phased AC voltage output.

This is advantageous in that it has the effect, that inrush currents to the load may be reduce. The ramping up of the output voltage may be done by PVM control.

According to an exemplary embodiment of the invention, the measurement of the first, second and/or third phase AC output voltages includes at least one of phase angle, amplitude and frequency.

This is advantageous in that it has the effect, that the 120 degrees displacement between already established phase AC output voltage of and subsequent phase AC output voltage can be generated.

According to an exemplary embodiment of the invention, the subsequent phase voltage is started when the measurement of an already established phase AC output voltage complies with predetermined reference values.

The predetermined values are known by the second and third string controllers, hence when these values are reached, the subsequent string controller starts controlling the switching arrangements of its associated battery string to establish the next phase AC output voltage.

According to an exemplary embodiment of the invention, the subsequent phase AC output voltage is not started until a predetermined period of time of at least one cycle has elapsed.

This is advantageous in that in this way it is ensured, that the already established phase AC output voltage is stabile and therefore ready for use as reference for establishing a subsequent phase AC output voltage.

According to an exemplary embodiment of the invention, each of the string controllers measures the phase AC output voltage generated by its associated battery string and at least one of the remaining two battery strings.

This is advantageous in that it has the effect, that a desired phase angle of preferably 120 degrees between the three phase AC output voltages can be maintained. It should be noted, that one string controller and the associated battery string preferably is assigned as the first battery string and used by the second and third battery strings as reference.

According to an exemplary embodiment of the invention, the method further comprises the step of connecting at least one battery module of either the first, second or third battery string to a second switching device.

This is advantageous in that it has the effect, that the high power uninterruptible power supply may establish power to its own controller(s) i.e. if the high power uninterruptible power supply controller is connected to the second switching device, then depending on the number of battery modules of a battery string that is connected to the second switching device, the controller is supplied with this voltage. Thereby, true black start of e.g. a wind turbine is facilitated.

According to an exemplary embodiment of the invention, the connection of one or more battery modules to the second switching device is established by a manually operated electric switch.

This is advantageous in that it has the effect, that no standby power is needed and thereby no consumption from the battery modules occurs unless necessary for supplying a load.

THE DRAWINGS

Figure 1B:
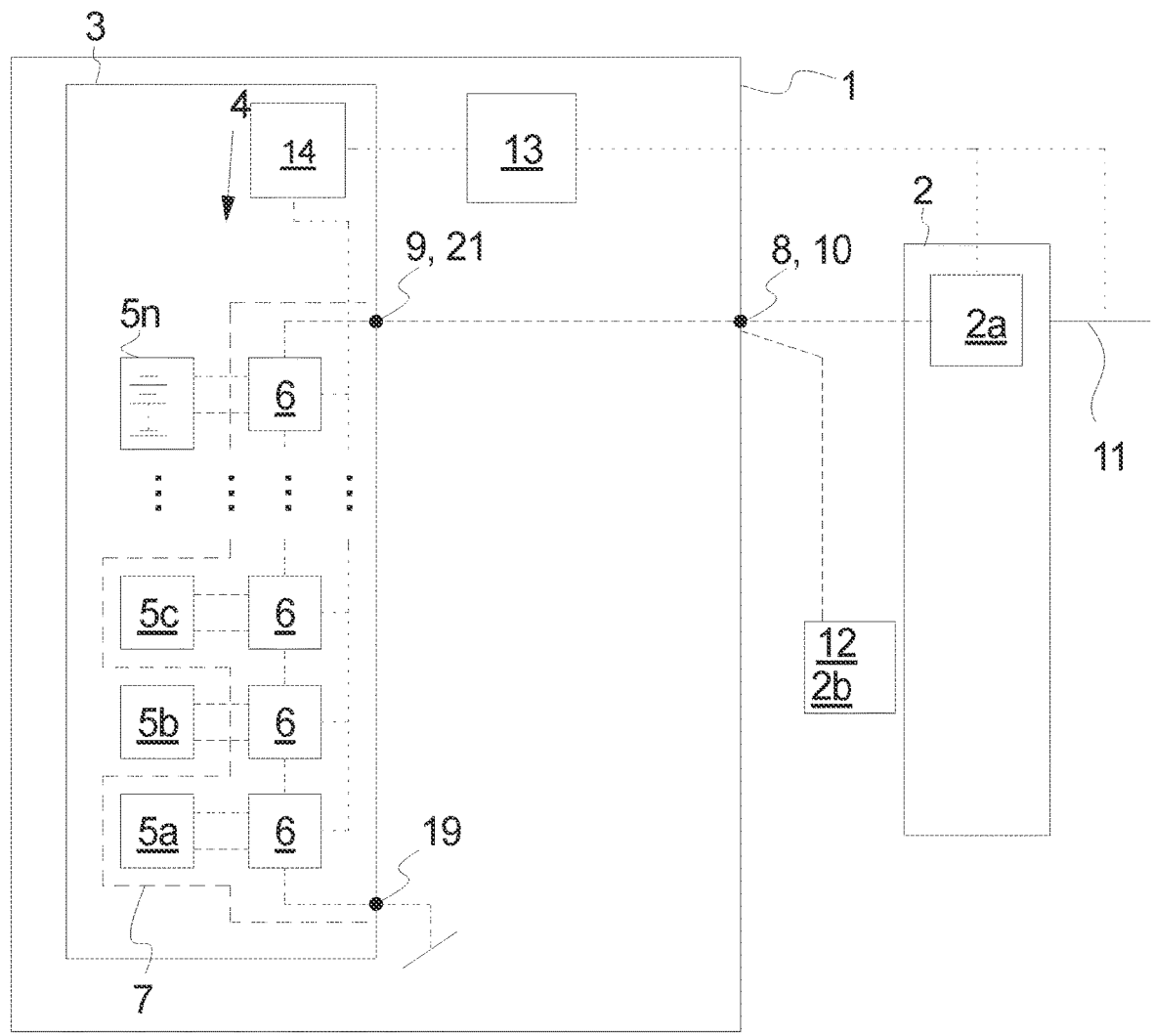
Figure 1C:
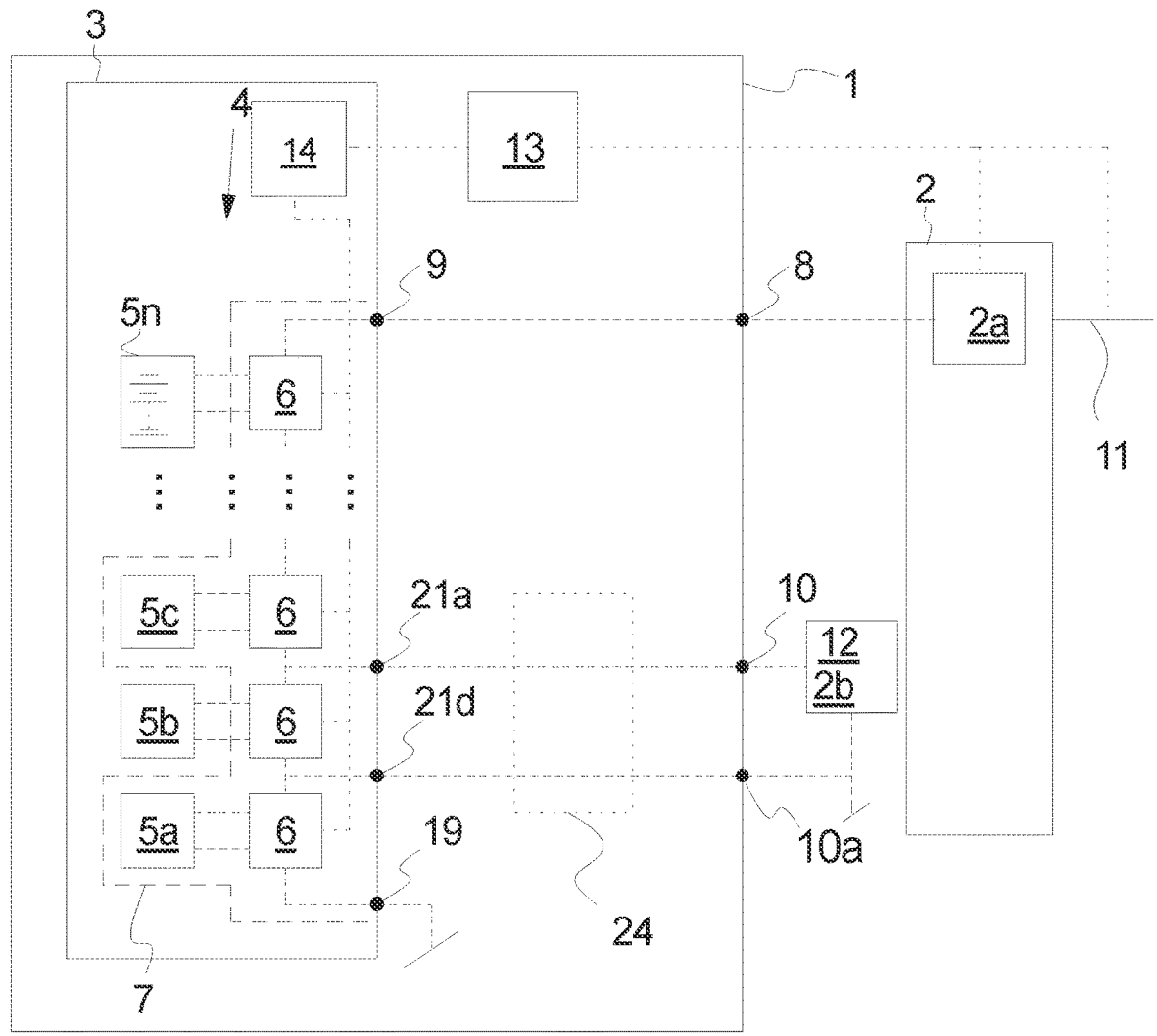
Figure 2:
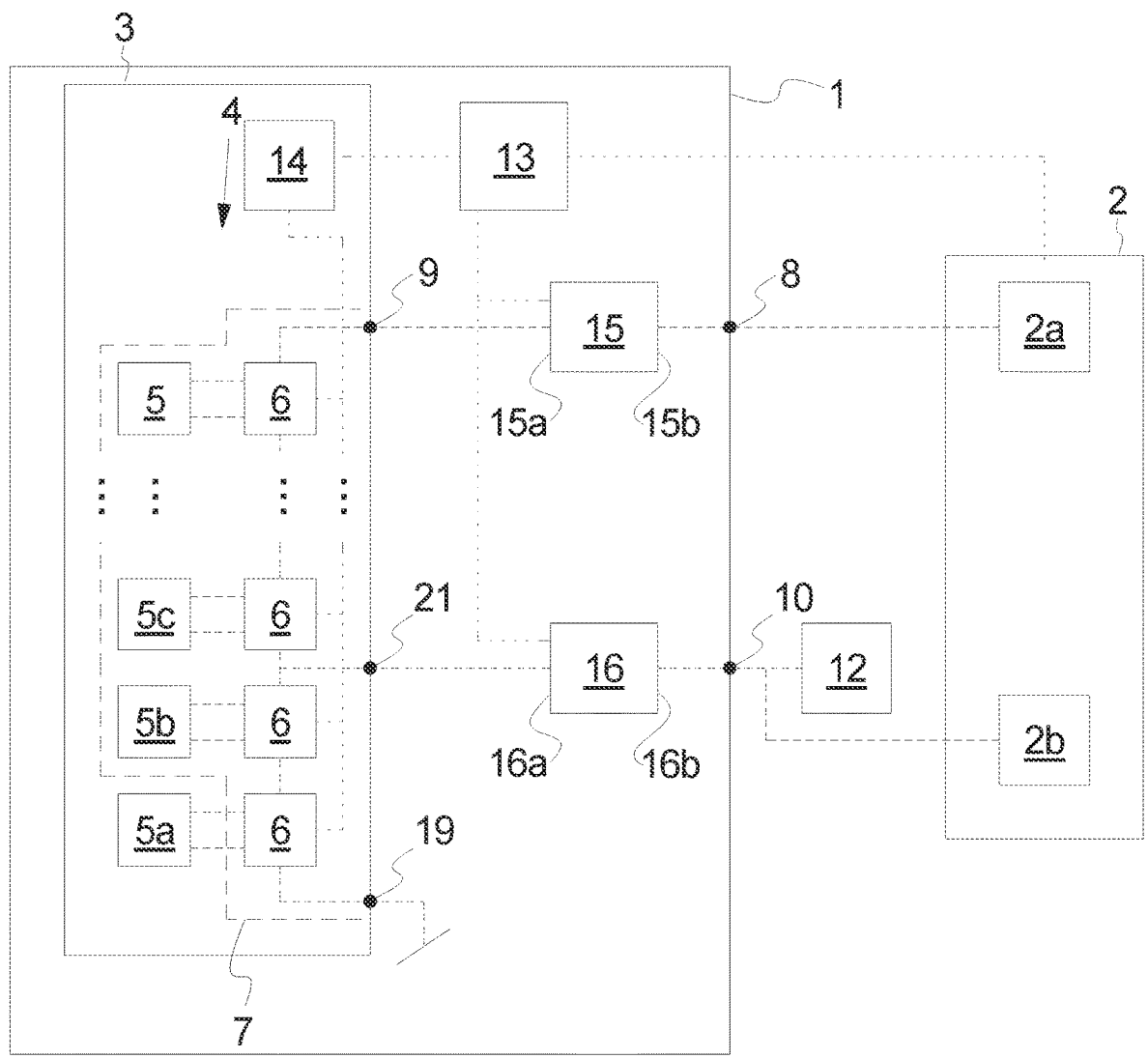
Figure 3:
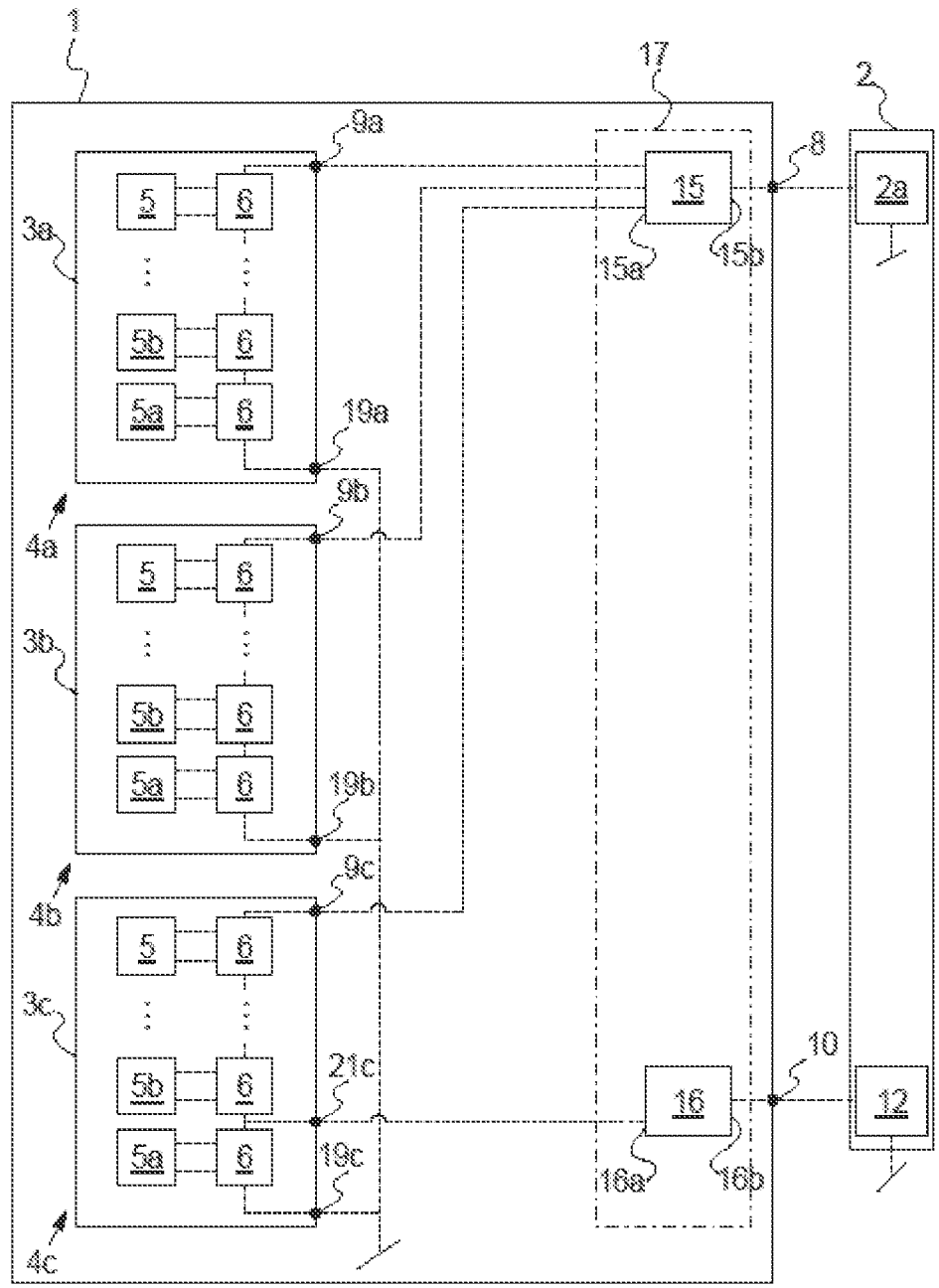
Figure 4:
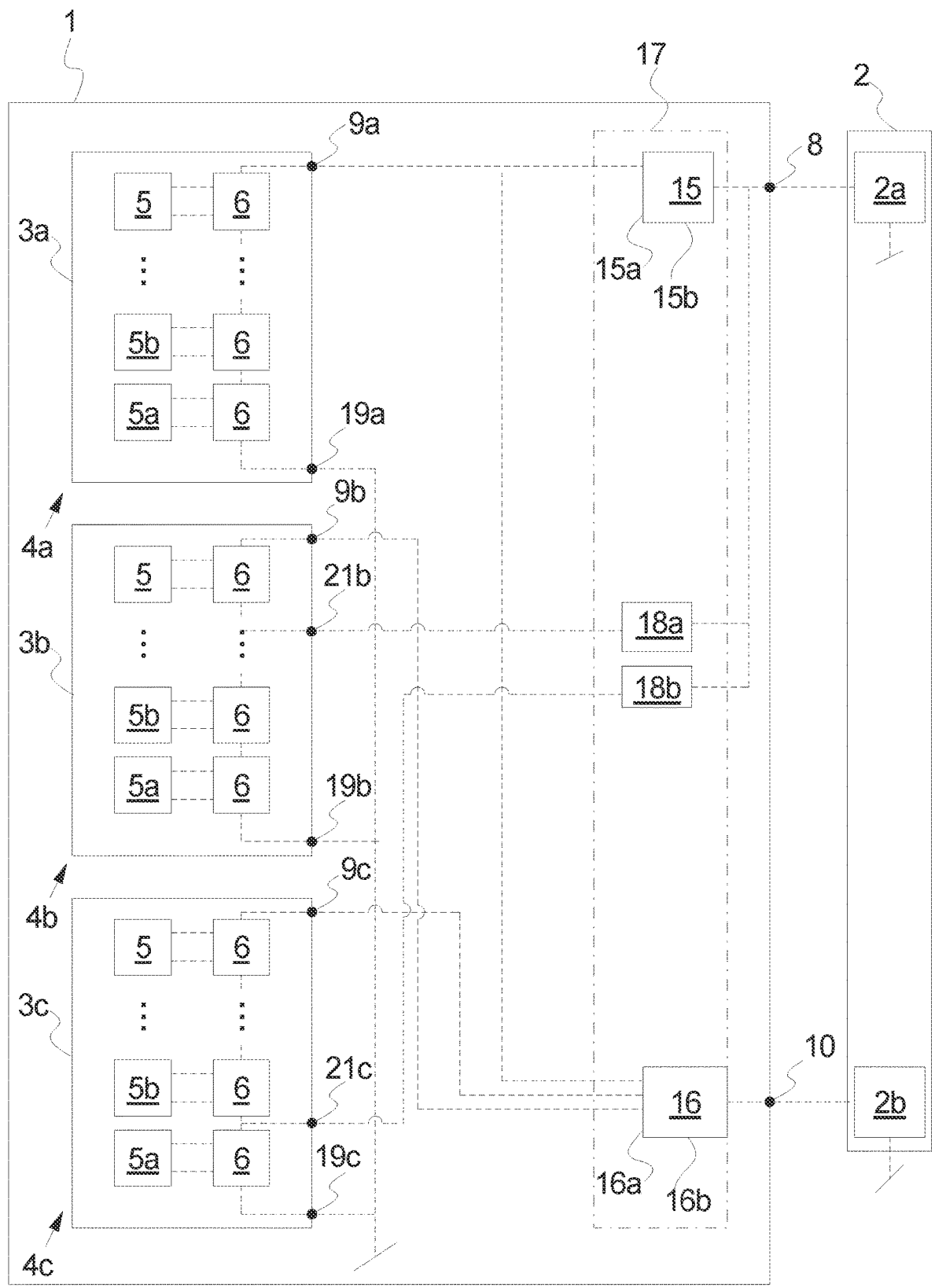
Figure 5:
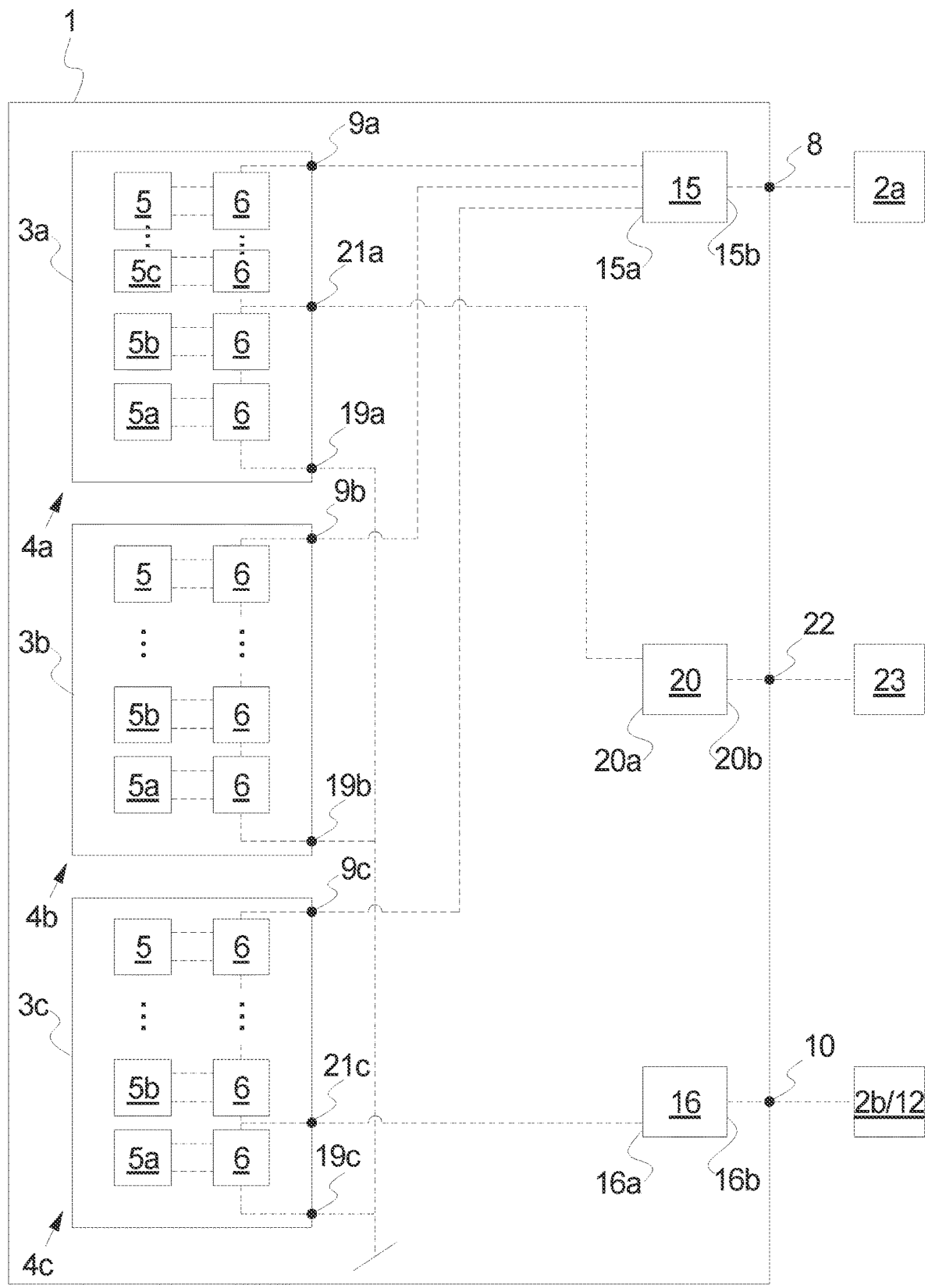
Figure 6:
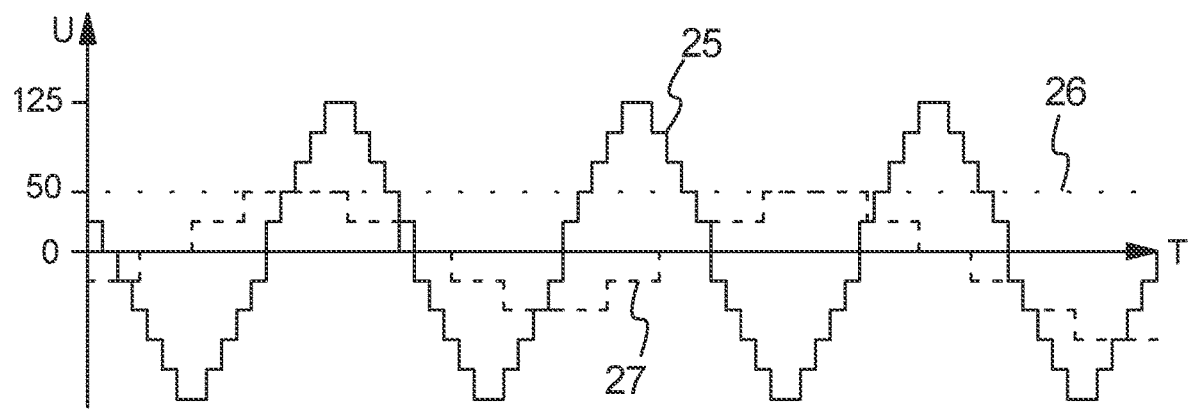

For a more complete understanding of this disclosure, reference is now made to the following brief description, taken in connection with the accompanying drawings and detailed description, wherein like reference numerals represent like parts:

FIGS. 1 and 2 illustrates a high power uninterruptible power supply having one battery string connected to a stationary electric system according to an embodiment of the invention, FIGS. 3 and 4 illustrates a high power uninterruptible power supply having three battery strings and hence both facilitates three phased and one phased output according to an embodiment of the invention, FIG. 5 illustrates a high power uninterruptible power supply having three output at different voltage levels, and FIG. 6 illustrates examples of output voltage to loads connected to the first and second uninterruptible power supply outputs.

DETAILED DESCRIPTION

FIG. 1a illustrates a high power uninterruptible power supply (HPUPS) 1 connected to a stationary electric system 2 according to an embodiment of the invention. In the present embodiment, the stationary electric system is a wind turbine connected to the grid 11, but could as well be e.g. a photovoltaic system, a datacentre, etc.

The stationary electric system comprises a first load 2a, which the HPUPS 1 is arranged to power in the case that the main power supply is unavailable. For example, in case of a disconnection from the grid, grid fault, or if the stationary electric system is not connected to the grid yet i.e. prior to commissioning of the wind turbine.

The first 2a load may for example be associated with controlling the stationary electric system 2. For example, it may be associated with control of a climate system, pitch or yaw systems or controllers of the control system or any other elements of the auxiliary system of the wind turbine. In this way the HPUPS may for example supply power to the first load 2a and thereby facilitate changing the orientation of a nacelle or blades of a wind turbine, massage bearings, etc.

The HPUPS 1 comprises an electrical cabinet 3 which in turn comprises battery modules 5a, 5b, 5c, . . . , 5n each with an associate switching arrangement 6 which constitute a battery string 4. In FIG. 1, only four battery modules 5a, 5b, 5c, 5n are shown, but the invention is not limited to a particular number of battery modules 5. According to the invention, the number of battery modules of one battery string 4 is typically limited to between 5 and 25 modules. The number is determined by the desired battery string output voltage, hence if the one battery module voltage is 50V, and the desired battery string output voltage is 690V, at least 14 battery modules are needed.

Additional battery modules may be included in as string as backup if a battery module should for some reason need to be bypassed or if multiple output from the battery string is facilitated as described below. Further, additional battery modules than what is required to provide the required string voltage, may be included in a string if e.g. the string has to deliver one phase to a three phased output and a single phased output or several single phased outputs. This is because then the total capacity of the battery modules of the battery string may not comply with requirements e.g. to time the HPUPS can supply without being charged if not there is "overcapacity" so to speak in one or more of the battery strings 4.

A battery module 5 may typically comprise a plurality of battery cells connected in series between two connection points, e.g. a positive and a negative terminal. Returning to the above example, if a battery module voltage is 50 v and each battery cell is e.g. 3V, then the one batty module should include at least 17 3V battery cells. Typically, the battery cells are of the Li-ion type. It should be noted, that other battery types may be used alone or in combination. Further, capacitors may be used as energy storage of a battery module alone or in combination with battery cells.

The voltage of a battery string of an UPS of the present invention is controllably fixed e.g. at 50V or 230V independent of the power required by the load of the stationary system.

In an exemplary embodiment, the UPS of the present invention may be able to deliver 23 kW on each string i.e. above 60 kW in a three phased configuration. Further, in an exemplary embodiment energy wise one battery module may be able to deliver 2.5 kVA. Hence, in a battery string of 12 battery modules 30 kVA is available and in a three phased system 90 kVA is available.

As illustrated on FIG. 1a, each battery module 5 is associated with a switching arrangement 6 which is connected to the two connection points. The switching arrangements 6 are controlled by the string controller 14 associated with the battery string 4. In this way, the string controller 14 can either include or exclude a battery module in a current path 7, wherein the current path 7 extends from a first end of the battery string 9 to a second end of the battery string 19. As indicated in FIG. 1, the second end 19 may for example be connected to ground, e.g. signal ground, chassis ground, and/or earth ground.

Each of the switching arrangements 6 is preferably implemented as four switches in an H-bridge configuration (not illustrated), which is able to connect an associated battery module into the current path 7 using any of the two polarities of the battery module. As such, a switching arrangement 6 may be arranged to switch between connecting an associated battery module to the current path 7 such that the battery module supplies a positive voltage to the string, connecting the associated battery module to the current path 7 such that the battery module supplies a negative voltage to the string, and disconnecting the battery module from the current path 7.

The switches of the switching module may be semiconductors switches such as IGBT, but other type of switches may also be used. The switches may be implemented on a printed circuit board together with elements of a battery monitoring system such as voltage and temperature sensors, gate drives etc.

The switching arrangements 6 are as mentioned controlled by a string controller 14. In some embodiments, the string controller are communicating with a high power uninterruptible power supply controller 13 (referred to as HPUPS controller). The string controller 14, receives overall control signals from the HPUPS controller 13 and based thereon the string controller autonomously controls the switching arrangements 6 of the battery string. In this way, it is the string controller which based on the received control signals e.g. controls the charging/discharging of one or more battery modules in a string.

It should be noted, that in the embodiment where there are not HPUPS controller, relevant reference are pre-programmed in the string controller. Note also, that the HPUPS controller may be implemented as part of a controller of the stationary electric system.

The control performed by the string controller 14 is typically also based on measurements made at the individual battery modules 5 or at the battery string 4. Hence, temperature, state of charge, current, voltage, etc. are measurements made by the string controller and used by the string controller to control which of the battery modules of the battery string that should be included in the current path 7 either for charging or discharging.

In typical embodiments of the invention, the current path 7 may thus be understood as an electrical path extending between the second end of the battery string 19 to the first end of the battery string 9 which through switching arrangements 6 includes a number of battery modules according to control by a string controller 14. In FIG. 1, an exemplary current path 7 is illustrated, which includes two battery modules 5a, 5c while excluding other battery modules 5b, 5n.

Accordingly, the string controller 14 can control the current path 7 through the battery string 4 to establish any voltage which can be achieved by any combination of battery modules of the battery string. This includes, for example, DC voltage and AC voltage, wherein AC voltage may be obtained by gradually including/excluding battery modules in the current path 7 and reversing the polarity accordingly to obtain a voltage which has a time dependence which is approximately sinusoidal.

Further, the string controller 14 may control the switching arrangement 6 according to a Pulse Width Modulation or similar control principles which enables establishing a smooth battery string output voltage. This is in contrary to prior art systems where a battery module is either "ON" or "OFF" leading to a battery string output voltage stepping in steps of battery module voltage.

In the embodiment illustrated in FIG. 1, the battery string 4 has two voltage outputs 8, 10; one at the first end of the battery string 9, and one at a midpoint between two battery modules 21. The output at the midpoint between two battery modules 21 may thus provide a different output, e.g. an output of lower voltage, compared to the output at the first end of the battery string 9. The control of the current path 7 to provide a controllable output at the first end of the battery string 9 may thus also control the output at the midpoint between two battery modules 21.

Note that in principle, it may be possible to have an output between each of the battery modules and then by means of contactors be able to control the number battery modules connected to the string output 21.

The string controller 14 may for example control the battery string 4 to provide the same DC voltage at the first end of the battery string 9 and at the midpoint between two battery modules 21. Or, for example, to provide different DC voltages at the first end of the battery string 9 and at the midpoint between two battery modules 21. Or, for example, to provide the same AC voltage at the first end of the battery string 9 and at the midpoint between two battery modules 21. Or, for example, to provide different AC voltages at the first end of the battery string 9 and at the midpoint between two battery modules 21, for example approximately 400 Volt AC at the first end of the battery string 9 and approximately 230 Volt AC at the midpoint between two battery modules 21. Typically, any voltages provided by the string controller in combination with the battery string 4 will be chosen by the skilled person according to requirements of one or more loads 2b, 12 connected to the HPUPS. Hence, if the load 12 requires 50 Volt DC, the string controller 14 may be configured to control the battery string to provide approximately 50 Volts DC at the midpoint between two battery modules 21. At the same time, if the load 2b requires 230 Volts DC, the string controller 14 may be configured to control the battery string to provide approximately 230 Volt DC at the first end 9.

In some embodiments of the invention, the string controller 14 may be configured to control the battery string 4 to provide a combination of AC and DC voltages, for example a DC voltage at the midpoint between two battery modules 21 and an AC voltage at the first end of the battery string 9. The two voltages may for example be electrically separated by switching arrangements 6. In an embodiment, a battery string providing both AC and DC would need to compensate for the DC voltage. Hence, if the DC voltage corresponds to one battery module, then another battery module with opposite polarity would be need to establish 0 V AC voltage.

The load 12, which may receive power from at least one battery module 5 through the midpoint between two battery modules 21, the load 12 may for example be a load of the stationary electric system 2. For example, the stationary electric system 2 may have a first load 2a and a second load, wherein the load 12 is the second load.

In an embodiment of the invention, the second uninterruptible power supply output 10 is connected to the high power uninterruptible power supply controller 13, such that the controller 13 may be powered by battery modules of the battery string 4. Hence, in this embodiment, the load 12 is the HPUPS controller 13. The high power uninterruptible power supply controller 13 may for example be powered by a direct connection to the midpoint between two battery modules 21. In this way, the HPUPS controller 13 may wake up the string controller and thereby facilitate activation of the battery string. The string controller 14 may also be powered from the second output 10 i.e. the load 12 may comprise both the HPUPS controller 13 and the string controller 14.

In FIG. 1a, the output from the midpoint between two battery modules 21 receives power from between two switching arrangements 6. Alternative, the output 21 may be connected to one of the adjacent switching arrangements 6 As such, depending on the type of switching arrangements 6, the switching arrangements 6 may require control and/or power themselves before the midpoint between two battery modules 21 can provide an output. Therefore, in other embodiments, the midpoint between two battery modules 21 may be directly connected to a battery module connectors, such that control and/or power to switching arrangements 6 is not required before a battery module can supply power to the midpoint between two battery modules 21.

The connection of the output 21 directly to the battery module connectors are advantageous in that it facilitates true black start i.e. no switches of the switching arrangement 6 need to be powered or controlled to establish a voltage on the output 21.

FIG. 1b illustrates an alternative embodiment of a battery string 4 having two output. As illustrated, the first and second output 8, 10 are electrically the same. They may be implemented physically as two different set of electric terminals. Hence, to establish two different outputs at the same electric node, the string controller 14 controls the switching arrangements 6 to deliver one voltage at a first point in (duration of time) time and a second voltage at a second point in (duration of time of) time.

FIG. 1c illustrates an alternative embodiment of a battery string 4 having two outputs. As illustrated the load 12 is connected to the midpoints 21a, 21d, accordingly simultaneously as the first output 8 delivers a first voltage, the second output 10 may deliver a second voltage. The second voltage is depending on the number of modules 5 between the two midpoints 21a, 21d.

In the embodiment illustrate on FIG. 1c, the load 12, is not connected to the second end of the battery string 19. Instead the second output includes an independent neutral/reference potential denoted 10a having the potential of the midpoint denoted 21d. In this way, it is possible to control the voltage and reference potential to any level. In fact, it is possible to deliver any voltage at any output of the high power uninterruptible power supply by control of the switching modules and connection of the outputs 8, 10 to ends 9, 19 or midpoints 21 of the battery string. Obviously "any voltage" is within the range of 0V to maximum string voltage (positive and negative) defined by number and voltage of each of the battery modules.

In an embodiment, the connection between midpoints 21a, 21d and the load 12, an isolated power supply 24 e.g. in the form of a DC/DC converter may be included. In this way, it is possible to use the same neutral/reference potential at the load 12 as is in the rest of the high power uninterruptible power supply system. The power supply and reference is illustrated in FIG. 1c by stipulated lines.

It should be mentioned, that if a battery module is used as supply of the either the string controller or high power uninterruptible controller, preferably such DC/DC converter should have galvanic isolation, so that the used battery module can continue supplying a load such as the controllers even after the string has been activated. The battery module (s) to which the DC/DC converter is connected is not necessarily the first module in the string and therefore could be located at an alternating voltage potential once the string voltage control has been activated.

Further, is should be mentioned, that controllers can be supplied directly from the battery module 5 and not as illustrated from the switching modules 6. Doing so facilitates a reduction of standby consumption in that the switches does not have to be powered to be able to deliver battery voltage to the controllers/DC/DC converter.

In an embodiment, the battery module is manually connected to the DC/DC converter (e.g. a 24V power supply) with a push button. The push button activates a relay holding the battery module connected to the 24V power supply until the controllers had started up and activated the voltage output of the string which then may take over supply of the controller. After that, the relay automatically disconnected the battery module from the DC/DC power supply. The relay may also be disconnected in case the controllers does not started up after a certain timeout period, which may be implemented with a time relay hence only turn on in this embodiment is manually.

FIG. 2 illustrates a high power uninterruptible power supply (HPUPS) 1 according to another embodiment of the invention which comprises a first 15 and/or a second circuit breaker 16. The embodiment comprises many of the same features that is illustrated in FIG. 1, and accordingly, these features will not be explained in detail in the following.

A circuit breaker according to the invention is a switching device and may typically be an electrical switch such as a circuit breaker or contactor, for example an automatically operated electrical switch designed to break or shot an electric circuit and thereby allow current to flow or stop flowing in the circuit. A circuit breaker may thus either electrically connect or disconnect the two sides or the circuit breaker. A circuit breaker may also comprise a manual mechanical switch which can be operated by a user.

In the embodiment illustrated on FIG. 2, the first circuit breaker 15 has a first side 15a and a second side 15b, where the first side 15a is connected to the first end of the battery string 9 and the second side 15b is connected to the first uninterruptible power supply output 8. In a similar manner, the second circuit breaker 16 has a first side 16a and a second side 16b, where the first side 16a can be connected to the midpoint between two battery modules 21 and the second side 16b can be connected to the second uninterruptible power supply output 10.

Accordingly, the circuit breakers 15, 16 may connect the battery string of the HPUPS 1 to loads 2a of the stationary electric system 2, loads 12 outside the stationary system 2, loads 13, 14 of the HPUPS, etc.

In an embodiment of the invention, a black start of the stationary electric system 2 or of the HPUPS can be made, i.e. starting up the stationary electric system 2 or the HPUPS without any external power, e.g. from a utility grid 11. This may be particularly relevant in embodiments where at least one circuit breaker 15, 16 is connected directly to a battery module 5, for example such that the connection does not pass through a switching arrangement 6, which allows current to run without powering the switching arrangements first and without the load drawing standby power from the battery module(s) to which it is connected. Note that the output 8, 10 may be connected directly to the battery module as illustrated on FIG. 1.

A black start of a stationary electric system 2 may for example be relevant when the stationary electric system 2 is not connected to a power grid 11, e.g. when a wind turbine is under installation and has not yet been connected to the electrical power grid or the grid has been lost for some time long enough to shut down the wind turbine controller.

The embodiment illustrated in FIG. 2 further comprises a second load 2b of the stationary electric system 2, which shows that a HPUPS 1 according to the invention may for example be a current and/or voltage source for multiple loads, e.g. multiple loads of the same system.

Note that the HPUPS may be installed as part of the stationary electric system 2. i.e. as a stationary HPUPS of a wind turbine.

FIG. 3-5 illustrates embodiments of the invention where the HPUPS comprises more than one battery string 4. These figures illustrates three battery strings 4a, 4b, 4c without this number being limiting for the invention. Having three or more battery strings 4 enables establishing a three phased output voltage where each phase includes one or more battery strings 4.

To reduce the number of lines of FIG. 3, the embodiment illustrated on FIG. 3 does not include controllers 13, 14. These are however necessary as described above with reference to FIGS. 1 and 2. Hence, a string controller is preferably included in each of the cabinets 3a, 3b, 3c for controlling the battery strings 4a, 4b, 4c thereof. The string controller communicates with the HPUPS controller if such is present as described above. In embodiments where an interface cabinet 7 is present as described below, the HPUPS controller is preferred to communicate (control status, measure/receive values, etc.) with and control circuit breakers 15, 16 and communicate with the loads 2a, 12, stationary electric system 2, utility grid 11, etc. as part of an higher level control.

The HPUPS 1 illustrated on FIG. 3-5 comprises a first 3a, a second 3b, and a third electric cabinet 3c. Each cabinet 3a, 3b, 3c comprises battery modules 5a,5b, ..., 5 and switching arrangements 6, such that the respective cabinets 3a, 3b, 3c comprise a first 4a, a second 4b, and a third battery string 4c. The first 3a, a second 3b, and a third electric cabinet 3c further respectively comprise a first end 9a, 9b, 9c of the first, the second and the third battery string respectively and a second end 19a, 19b, 19c of the first, the second, and the third battery string respectively. As such, each of the individual cabinets 3a, 3b, 3c may for example be individually considered substantially similar to the electric cabinet illustrated in FIG. 1-2.

A purpose of having three cabinets 3a,3b,3c, is that each individual cabinets may provide an approximately sinusoidal voltage, which has a different phase than the other two cabinets. Also more than one cabinet of individual strings may be relevant if two or more stings are to be connected to reach a desired capacity in the energy storage.

The combination of three cabinets 3a,3b,3c may be used to generate three-phased electric power output from the HPUPS, as an alternative to the utility grid. For example, the first battery string 4a in the first electric cabinet 3a may be controlled to provide an approximately sinusoidal voltage of frequency 50 Hz. Simultaneously, the second battery string 4b in the second electric cabinet 3b may be controlled to provide an approximately sinusoidal voltage of frequency 50 Hz which is phase shifted with approximately 120 degrees compared to the output of the first battery string 4a. And simultaneously, the third battery string 4c in the third electric cabinet 3c may be controlled to provide an approximately sinusoidal voltage of frequency 50 Hz which is phase shifted with approximately 120 degrees compared to the sinusoidal voltage of frequency 50 Hz of the second battery string 4b. The combination of phase-shifted sinusoidal voltages may thus provide three-phased electric power output of the HPUPS.

In the embodiment illustrated in FIG. 3, the three battery strings 4a, 4b, 4c are connected to the first side 15a of a circuit breaker 15. The second side 15b of the circuit breaker 15, which also constitute a first output 8 of the HPUPS 1, may thus be understood as a three-phased electric high power output.

In the embodiment illustrate in FIG. 3, a second circuit breaker 16 is illustrated as connected to the midpoint 21c of the third battery string 4c. In this way, the HPUPS 1 provides an additional one phased output and thus enabling the HPUPS to supply two different loads requiring different nominal voltage and number of phases. Via the circuit breakers 15, 16, the loads 12, 2a can be supplied independently. Hence, when the three phased load 2a in this embodiment is powered and the battery module 5a of the third battery string 4c is required, then the battery module voltage of this battery module 5a is present on the first side 16a of the second circuit breaker. However, if the load 12 does not need supply, then the HPUPS controller 13 maintains the second circuit breaker open and therefore no output voltage is present at the second HPUPS output 10.

The HPUPS 1 is in the figures illustrated as being external to the stationary electric system 2. However, it is preferred e.g. if the stationary electric system is a wind turbine, that the HPUPS 1 is an integrated part of the wind turbine facilitating supplying several loads of the wind turbine with power at least in case of grid failure. The HPUPS may be locate in the tower or nacelle from where the loads are connected to the HPUPS via cables.

Further, as illustrated in FIG. 3, an interface cabinet 17 is included as a separate part of the HPUPS 1. The purpose of the interface cabinet 17 is to establish one point of connection to the loads. Hence, the individual phases from the individual battery strings are provided to the interface cabinet 17 where the relevant circuit breakers are located. The loads on the other hand are then connected to the phases of the battery strings via the circuit breaker located in the interface cabinet. Accordingly, in an embodiment the HPUPS comprises four electric cabinets one for each of the three battery strings and one for the interface cabinet. The weight of each of these cabinets is above 100 Kg. It should be mentioned that if required by voltage level or capacity two or more cabinets each comprising a battery string can be connected in series or in parallel to comply with requirements to the phases of the HPUPS 1.

In an embodiment, first contactor may be positioned in the electric connection between one battery string 4 and the first, second or third circuit breaker 16 and a second contactor may be positioned in the electric connection between the battery string 4 and the third circuit breaker 20. The high power uninterruptible power supply controller 13 is then configured to control the status of the first and second contactors and thereby the voltage of the first side of the first, second or third circuit breakers.

This is advantageous in that it has the effect, that the controller can prevent voltage on the first side of a circuit breaker by opening the relevant contactor. It should be mentioned, that by controlling of the switches of the battery modules, it is possible to obtain the same function as the contactors, hence the contactors can be seen as an extra safety device.

FIG. 4. Illustrates an embodiment of the invention, where the load 2b connected to the second circuit breaker 16 is a three phased load supplied from the first end 9a, 9b, 9c of all three battery strings 4a, 4b, 4c. In addition, the interface cabinet 17 comprises first and second additional circuit breakers 18a, 18b which together with the first circuit breaker 15 supplies a single phase output to the first output 8 of the HPUPS 1. The first circuit breaker 15 can maximum provide full battery string voltage because it is connected to the first end 9a of the first battery string 4a. The first additional circuit breaker 18a can maximum provide a voltage corresponding to two times battery module voltage due to its connection to midpoint 21b of the second battery string 4b. The second additional circuit breaker 18b can maximum provide a voltage corresponding to one battery module voltage due to its connection to midpoint 21c of the third battery string 4c. The capacity of the circuit breakers 18 may not be limited to the capacity of a number of battery modules, they may be of the same type capable of handling full string current In principle, if the additional circuit breakers 18a, 18b were connected to ends 9b, 9c of the second and third battery strings 4b, 4c, the string controllers of these strings would be able to control the current path 7 through these strings to deliver two and one battery module voltage respectively. However, if the load 2b requires power, the string controllers may need to include all battery modules of the respective battery strings in the current path and therefore the voltage at the additional circuit breakers 18a, 18b would also be the full string voltage. Therefore, it is advantageous to connect the additional circuit breakers 18a, 18b to the midpoints 21b, 21c.

Further, in an embodiment where the HPUPS 1 is supplying or is backup supply for a three phased load and simultaneously supplying a single phased load, the string supplying the single phase can be changed. This may be relevant if the state of charge of the string first having supplied the single phases load is reaching a threshold value for state of charge and therefore needs to be charged.

In case the supply to the single phased load is a DC, it is relatively easy to swap supplying string (/cabinet) in that only voltage between the two strings needs to be aligned. In case the load is an AC load, the voltage need to be synchronized to ensure a smooth phase (string) swap. In this situation, while the first string is supplying the AC load, the second string is started up and the voltage is synchronized with the first string. When synchronized, the second string is connected to the AC load so that now two phases are sharing the supply of the AC load. After this connection, the first string is disconnected and is ready for being recharged while the seconds string is now supplying the AC load.

In this way a three phased HPUPS 1 can share the supply of a single phased load. Thereby, the HPUPS 1 can act as/as supply to an online UPS in that one phase is always available for supplying e.g. a commercial UPS. Not that the commercial UPS may be replaced by a simple drive. Such drive may include a simple inverter and rectifier and thereby the costs related to commercial UPS and associated battery backup can be removed from the stationary system when implementing a HPUPS 1 of the present invention.

The physical phase swap can be facilitated by contactors 15, 16, 18 or other not illustrated contactors, whereas the swap control is controlled by the string controllers of the string in question. These string controllers may communicate directly or via a HPUPS controller 13.

FIG. 5 illustrates an embodiment of the invention where the HPUPS includes a third circuit breaker 20. In this embodiment, the HPUPS 1 thus facilitates independently supplying power to a three phased load via output 8, and two one phased loads via outputs 10 and 22. The connection of the one phased outputs to the battery strings 4 is not important as long as it include battery modules enough to establish the required output voltage at outputs 10 and 22.

On FIG. 5, these connection points are 21a and 21c, however, these connection points could be chosen different again as long as it is possible to supply the required output voltage. And additional outputs could be established.

As described above, the string controllers 13 or the high power uninterruptible power supply controller may facilitate control of the neutral/reference potential of one or more of the battery strings. Hence, in a three phased system as illustrated in FIG. 3-5 where the high power uninterruptible power supply is able to deliver both a three phased output and a one phase output this can be obtained from the same electric node but not simultaneously in time.

One way of facilitating this is to change neutral/reference potential according to output voltage. This can be done by connecting second ends 19a, 19b, 19c together in a node without connecting this node to a reference potential, contrary to what is illustrated on FIG. 3-5, when a first output of e.g. 400V AC is desired from the high power uninterruptible power supply. When e.g. a 230V AC is desired, the second end 19 of the string 4 that is to deliver this voltage is disconnected from the node. Instead, it may be connected to a reference potential as illustrated in the figures.

Another example of two different output voltages from the high power uninterruptible power supply is explained with reference to FIG. 5. The three strings 4 illustrated may together provide a first output at the first side of the breaker 15 of 690V (or whatever voltage can be established by the modules 5 of the strings) when all first ends 9a-9c are connected to the first side of the breaker 15 and all second ends 19a-19c are connected to each other. Even though illustrated a neutral/reference potential does not have to be connected to this node to provide this voltage. Simultaneously or subsequent in time, the string denoted 4a may be connected from midpoint 21a and second end 19a to breaker 20 and thereby provide 230V (or whatever voltage can be established by the modules 5 between second end 19a and midpoint 21a) at output 22.

Further not illustrated embodiment are described below. The respective cabinets 3a, 3b, 3c may each comprise two midpoints between two battery modules 21a, 21b, 21c. Consequently, each of the electric cabinets 3a, 3b, 3c may in this embodiment, be able to provide two or more outputs one from the first end of the battery string 9a, 9b, 9c, and additional from the midpoints between two battery modules. The second end of the battery string 19a, 19b, 19c is connected to ground for each of the electric cabinets 3a, 3b, 3c.

In an embodiment, each of the electric cabinets 3a, 3b, 3c further provide outputs from midpoints between two battery modules 21a, 21b, 21c. These outputs may for example respectively have the same phase angle as the outputs from the respective first ends of the battery strings 9a, 9b, 9c, but with a lower voltage. As such, the outputs from midpoints between two battery modules 21a, 21b, 21c can for example be used two generate three-phased electrical power with lower voltage than at the first UPS output 8. Three of the outputs from midpoints between two battery modules 21a, 21b, 21c may thus be provided to a first side 16a of a second circuit breaker 16, and the output from the second side 16b of that circuit breaker 16, which also constitute a second output 10 of the HPUPS 1, may thus also be understood as a three-phased electric power output. Similarly, three other of the outputs from midpoints between two battery modules may be provided to a first side 20a of a third circuit breaker 20, and the output from the second side 20b of that circuit breaker 20, which also constitute a third output 22 of the HPUPS 1, may thus also be understood as a three-phased electric power output.

In this embodiment, in total, the HPUPS thus have three different outputs 8, 10, 22, each for example providing three-phased electric power output of different respective voltages. Note that embodiments of the invention are not limited to three outputs with three-phased electric power. Embodiments of the invention may feature any number of outputs with any combination of AC and DC voltage outputs within the scope of the claims.

The control of the battery strings 4a, 4b, 4c may for example be facilitated by a string controller in combination with a high power uninterruptible power supply controller, for example in a manner similar to that illustrated in FIG. 1. The string controller and/or the combination of the string controller and the high power uninterruptible power supply controller may for example determine the output voltages of the electric cabinets 3a, 3b, 3c and, consequently, the outputs 8, 10, 22 of the HPUPS 1, including the relative phase between approximately sinusoidal outputs of the electric cabinets 3a,3b,3c.

Embodiments of the invention may thus for example be configured to provide an RMS output voltage at the first UPS output of approximately 400 Volts. This output may for example be combined with an RMS output voltage at the third UPS output of approximately 230 Volts. In some embodiments of the invention, a three-phase electric power output may be provided at one output of the UPS, while a single-phase electric power output is provided at another output of the UPS.

Accordingly, an UPS according to the present invention is able to deliver multiple outputs simultaneously, such output having different voltages and may have different types (AC or DC). The more battery strings, the more flexible the system is so that one string can be controlled to deliver DC and another can be controlled to deliver AC.

The control of the polarity of the battery modules 5 located between first end 9 and midpoint 21 and between second end 19 and midpoint depends on voltage requirements from the load connected to the outputs 8, 10. A load could either require to be supplied with an AC or DC voltage. In embodiments, the load could also either draw current from or push current to battery modules 5 connected to the battery string 4.

With reference to FIGS. 1a and 6, in an embodiment, where an AC load is connected to the first output 8 and a DC load is connected to the second output 10 the voltage compensation mode may be implemented as follows to allow simultaneous supply of the two loads. The DC load 12, 2b may require 50 VDC, the battery modules are 25V modules and the AC load 2a may required 125 VAC. To deliver 50 VDC (denoted 26 in FIG. 6), the polarity of the battery modules 5a and 5b are both controlled to be positive. Therefore, when the AC voltage to the load 2a is to be established, the control of the remaining battery modules 5c-5n should be compensated for this 2 times "plus" 25V contribution from modules 5a and 5b. Hence, when e.g. the AC voltage (denoted 25 in FIG. 6) is to be "0V" (zero volt), two modules e.g. 5c and 5d (5d not illustrated in FIG. 1a) are both controlled to have a negative voltage. In this way this 2 times "minus" 25V compensate for the 2 times "plus" 25V and together the string voltage at the first output 9 is controlled to be "0V". In the same way at other voltage levels of the square formed sinus curve 25 the string controller compensate for the two positive modules to establish the required string voltage.

In the same way if the load connected to the first output 8 is a DC load, the battery modules only supplying the first output 8 is controlled to have a constant polarity. If then the load connected to the second output 10 is an AC load, the battery modules only supplying the first output 8 is controlled according to the voltage compensation mode ensuring a constant DC voltage at the first output in dependency of the level of the AC voltage at the second output 10.

Having two outputs obviously load the battery modules 5 contributing to supply of both outputs more that the battery modules 5 only contributing to supply one output. Depending on the number of battery modules 5 between the reference at the second end 19 and the midpoint 21 and between the midpoint and the first end 9, rotation of battery modules in use can be made to either ensure equal load, emptying one battery module completely, ensure sufficient power to the load (connecting additional battery module(s) or according to other control strategies.

Note, that the sinus curves illustrated in FIG. 6 is illustrated as square wave formed sinus curves 25, 27 having steps of 25V (one battery module voltage). This is to easier explain the voltage compensation mode, knowing that the duration of the individual steps may vary, the signal may subsequently be filtered or in other way manipulated if required.

As mentioned, FIG. 6 also illustrates a second square formed sinus curve denoted 27. The frequency of this sinus signal 27 is higher than the frequency of the sinus signal denoted 25. This is to illustrated, that it is possible to supply three output of different types (DC, AC, frequency). Also it is used to illustrate that to first and second output 8, 10 may both be AC having different frequencies such as 50 Hz and 60 Hz.

Controlling the two outputs 8, 10 to be AC having the same or different frequencies may require a minimum number of battery modules that is higher than if the outputs 8, 10 are AC and DC respectively.

As understood from this document, when referring to control a battery module, a voltage, etc. a reference is made to control of the switches of the switching modules 6 associated with the individual battery modules.

In the situation where the uninterruptible power supply 1 includes more than one battery string 4, it is possible to change the string supplying the load(s) connected to the first and/or second outputs 8, 10. Alternative, if power or voltage available in a first string is insufficient to cover the need of the load, two strings can be connected in series or parallel to have more battery modules available to and thereby combine to comply with voltage/power demand from the load.

If two strings are connected, the string controllers thereof may synchronize the voltage of the battery strings before connecting them. This can be done when starting up the second string, then this is done based on a reference received from the first string.

A case where the UPS output 8 of FIG. 5 delivers three phases, the UPS system comprises three battery strings 4a, 4b, 4c illustrated on FIG. 5. The UPS controller may receive references from external electric systems such as the grid to ensure correct frequency, phase angles of the UPS system output and e.g. the grid to which it is connected. However, in the situation, where there are no references to get from other electric systems, the three phased UPS system of the present invention is able to perform an isolated start-up, a true black start.

Such true black start is made according to the following steps. First, the high power UPS controller is prompted to start up the UPS system either via remote control, local control or a timer. The possibilities depends on if the UPS controller is powered or not. The possibilities hereof with the present invention are described above.

When started, the UPS controller powers up the string controllers at leas the one controlling the first battery string or if already powered up, sends references to that string controller related to frequency, amplitude, etc. of the phase output from that battery string.

When the first battery string produces an output complying with the received references, the first phase of the three phased output is established. The string controller of the second battery string, which is to establish the second phase of the three phased output, is measuring the output of the first phase. The measurements includes at least one of phase angle, frequency and amplitude and based thereon, the second string controller establishes the second phase of the three phased system 120 degrees displaced with respect to the first phase.

When the first and second phases are established, the third string controller measures the second phase to obtain information of at least one of amplitude, frequency and phase angle. Based thereon, the third string controller establishes the third phase of the three phased system 120 degrees displaces with respect to the second phase.

It should be mentioned that the third phase could be established based on measurements of the first phase instead of the second. Further, it should be mentioned, that the establishing of the three phased is done by controlling the switches of the battery modules of the battery strings to form the desired output voltage. Further it should be mentioned, that preferably one phase has been stabile for at least one period before the next phase is started up, this is to ensure correct measurements and thereby correct establishing of the second phase.

Accordingly it is clear from the above approach, that what is most important to measure or establish from a measurement is the phase angle commonly referred to as $\omega$ (omega). Hence, based on the $V=A*\sin(\omega t)$ the voltage of the first phase voltage can be established. The second and third phase voltages can be determined by the same formula, by adding how many degrees the phase voltages needs to be displaced from the first. Typically, this would be 120 degrees and the formula of the second phase voltage would be $V=A*\sin(\omega t+120°)$, where A is the amplitude of the voltage.

The three phased output can also be generated by an alternative approach where no measurements are requires. This approach is based on a synchronisation signal between the string controllers. Such synchronisation signal could include information of timing e.g. of when the AC voltage passes 0V, amplitude and frequency of the signal, etc. in fact only information of the timing/phase angle is required, the rest can be pre-programmed in the string controller.

The measuring approach is advantage over this approach in that this approach requires additional hardware to connect the battery string to facilitate communication of the synchronisation signal therebetween and to ensure galvanic separation between the battery strings.

No matter which approach is used, the order of the sting controllers to establish a phase voltage can be pre-programmed in the string controllers or determined mechanically e.g. by dip switches.

Further, no matter which approach is used, the breaker 15 should not be shut before each of the three phase voltages are established correct.

The control of the switched may be based on pulse width modulation which has the effect, that each battery module then can deliver any desired contribution (max full battery module voltage) to the string voltage. In this way the string controllers are provided with a huge flexibility with respect to choice of contributing battery modules. The choice of battery modules can be made based on information received from each of the battery modules. Such information can be established by a battery monitoring system (BMS; Battery Monitoring system) associated with each of the battery modules. Such BMS system may include voltage and temperature sensors providing information to the string controller of the individual battery. Further the BMS system may also include current sensors on each module or at least one current sensor in the battery string. The latter being advantageous in that a reduction of currents sensor can be made.

The flexibility in control also relates to on-time of the individual modules. Hence, the string controller may control when a battery module contributes during one period, this is advantageous in that switch losses can be avoided if the battery modules e.g. are not turned off in the opposite order as they are turned on.

From the above, it is now clear that the invention relates to high power uninterruptible power supply for a stationary electric system. The uninterruptible power supply may comprise one or more battery strings in respective electric cabinets and each string controller by a string controller. This allows voltages of battery modules to be combined in any manner required, such that a cabinet can provide several outputs of constant and/or alternating voltage. Outputs of an electrical cabinet can be directly used as an output for the uninterruptible power supply, or they can be combined with outputs of other electrical cabinets, for example to establish a three-phased electric power output. Any output of the uninterruptible power supply may optionally be combined with a circuit breaker to provide safety and/or to facilitate manual input. An uninterruptible power supply according to the invention is thus able to provide multiple flexible outputs for a stationary electric system. Particularly, some embodiments of the invention may be manually activated to grant temporary control of a stationary facility, for example when power through the power grid is not currently available.

The invention has been exemplified above with the purpose of illustration rather than limitation with reference to specific examples of high power uninterruptible power supplies for stationary electric systems. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

It should be mentioned, that a high power uninterruptible power supply according to the present invention and as describe above, may require components that are not illustrated in any of the figures to work proper or to be implemented in a particular application. An example of such components is filtering inductors which are not illustrated on the figures but which both location and effect will be known to the skilled person.

LIST

1. High power uninterruptible power supply (HPUPS)
2. (2a, 2b) Stationary electric system loads
3. (3a, 3b, 3c) Electric cabinets
4. (4a, 4b, 4c) Battery strings
5. (5a-5n) Battery modules
6. Switching arrangement
7. Current path
8. First uninterruptible power supply output
9. (9a, 9b, 9c) First end of the battery strings
10. Second uninterruptible power supply output
11. Utility grid
12. Load
13. High power uninterruptible power supply controller
14. String controller
15. First switching device such as circuit breaker or contactor (15a, 15b sides thereof)
16. Second switching device such as circuit breaker or contactor (16a, 16b sides thereof)
17. Interface cabinet
18. (18a, 18b) Additional switching device such as circuit breaker or contactor
19. (19a, 19b, 19c) Second end of battery strings
20. Third switching device such as circuit breaker or contractor (20a, 20b sides thereof)
21. (21a, 21b, 21c) Midpoints between two battery modules
22. Third uninterruptible power supply output
23. Third load
24. Lifting points
25. AC output
26. DC output
27. AC output

The invention claimed is:

1. A high power uninterruptible power supply connectable to a stationary electric system, the high power uninterruptible power supply comprising:
   an electric cabinet comprising a battery string, the battery string comprising a plurality of battery modules each associated individually with a switching arrangement wherein the switching arrangements each comprises four switches configured in an H-bridge and are configured to include the associated battery module in or exclude the associated battery module from the battery string and thereby to establish a current path through the battery string, including at least two battery module of the plurality of battery modules,
   a first uninterruptible power supply output electrically connected to a first end of the battery string and which is connectable to a first load of the stationary electric system,
   a second uninterruptible power supply output electrically connected to the battery string so as to facilitate supplying a load with the voltage of at least one battery module,
   a string controller configured to receive a control reference and based thereon configured for controlling the operation state of switches of the switching arrangements and thereby the current path through the battery string and thereby the voltage level and current direction of the first and second uninterruptible power supply output.

2. The high power uninterruptible power supply according to claim 1, wherein the first and second output are electrically the same output, configured to deliver a first voltage at a first point in time and a second voltage at a second point in time.

3. The high power uninterruptible power supply according to claim 1, wherein the load is supplied from one midpoint between two battery modules and from another midpoint between two battery modules.

4. The high power uninterruptible power supply according to any claim 1, wherein a first side of a second switching device is connected to the battery string by a direct connection to one battery module.

5. The high power uninterruptible power supply according to claim 1, wherein the load is connected to a second side of the second switching device is one of a high power uninterruptible controller and the string controller.

6. The high power uninterruptible power supply according to claim 1, wherein the high power uninterruptible power supply comprises three battery strings, and wherein the high power uninterruptible power supply comprises three electric cabinets, each of which comprises one of the three battery strings.

7. The high power uninterruptible power supply according to claim 6, wherein the three battery strings are configured for supplying one three phased load and one single phased load simultaneously.

8. The high power uninterruptible power supply according to claim 1, wherein the high power uninterruptible power supply is configured to deliver a first output voltage at the first uninterruptible power supply output simultaneously with a second output voltage at the second uninterruptible power supply output,
wherein the first output voltage is generated by at least two battery modules from the battery string and the second output voltage is generated by at least one battery module of the battery string.

9. The high power uninterruptible power supply according to claim 1, wherein the string controller is configured for individually controlling on-time of the battery modules and thereby voltage at and/or current contribution from the individual battery modules to the first and/or second uninterruptible power supply outputs.

10. The high power uninterruptible power supply according to claim 1, wherein, when a first load is connected to the first uninterruptible power supply output and a second load is connected to the second uninterruptible power supply output, the string controller is controlling the on-time of battery modules only contributing to supply the first load according to a voltage compensating mode, wherein the voltage compensating mode include, based on knowledge of battery module voltage and current of the first and/or second uninterruptible power supply output, controlling the operation state of switches of the switching arrangements associated with battery modules located in the battery string between a second end of the battery string and a midpoint to have a different polarity than battery modules located in the battery string between a first end of the battery string and the midpoint.

11. The high power uninterruptible power supply according to claim 1, wherein the string controller controlling the individual battery string connected to either the first uninterruptible power supply output or the second uninterruptible power supply output is configured to establish an AC or a DC voltage on the first and second uninterruptible power supply outputs.

12. The high power uninterruptible power supply according to claim 1, wherein first ends of each of three battery strings are electrically connected to a first side of a first switching device of an interface cabinet.

13. The high power uninterruptible power supply according to claim 12, wherein the high power uninterruptible power supply is configured to deliver a three phased output voltage via the first uninterruptible power supply output simultaneously with a one phased output voltage via the second uninterruptible power supply output,
wherein the three phased output voltage is generated by at least one battery module from each of the three battery strings and the one phased output voltage is generated by at least one battery module from one of the three battery strings.

14. The high power uninterruptible power supply according to claim 1, wherein a first side of a second switching device is connected to a midpoint between two battery modules of the battery string.

15. The high power uninterruptible power supply according to claim 1, wherein the first load of the stationary electric system connected to the first uninterruptible power supply output is a three phased load of a wind turbine selected from the list comprising yaw motor, pitch motor, motor drive, lubrication system, breakers, cooling, control systems and heating systems.

16. The high power uninterruptible power supply according to claim 1, wherein an interface cabinet and/or the electric cabinet comprises lifting points configured for moving the cabinets.

17. The high power uninterruptible power supply according to claim 1, wherein the high power uninterruptible power supply is installed in a wind turbine prior to establishing an electric connection between the wind turbine and a utility grid.

18. The high power uninterruptible power supply according to claim 1, wherein the battery modules of the high power uninterruptible power supply are replaceable and wherein at least part of the battery modules of the high power uninterruptible power supply prior to grid connection of the wind turbine are second hand battery modules replaceable with new battery modules upon grid connection of the wind turbine.

19. The high power uninterruptible power supply according to claim 1, wherein a controller of the stationary electric system is configured to provide a control reference signal to a high power uninterruptible power supply controller based on which the high power uninterruptible power supply controller is configured for controlling a status of at least one of the first and second switching devices.

20. A high power uninterruptible power supply system comprising a stationary electric system and a high power uninterruptible power supply, the system comprising:
at least one electric cabinet comprising a battery string, the battery string comprising a plurality of battery modules each associated individually with a switching arrangement wherein the switching arrangements each comprises four switches configured in an H-bridge and are configured to include the associated battery module in or exclude the associated battery module from the battery string and thereby to establish a current path through the battery string including at least two battery module of the plurality of battery modules,
a first uninterruptible power supply output electrically connected to a first end of the battery string and which is connectable to a first load of the stationary electric system,
a second uninterruptible power supply output electrically connected to the battery string so as to facilitate supplying a load with the voltage of at least one battery module,
a string controller configured to receive a control reference and based thereon configured for controlling the operation state of switches of the switching arrangements and thereby the current path through the battery string and thereby the voltage level and current direction of the first and second uninterruptible power supply output.

21. A method of establishing a three phased AC output voltage of a high power uninterruptible power supply comprising a first, second and third battery string, each of the battery strings comprising a plurality of battery modules, an inclusion of which in a current path through one of the battery strings is controlled by a switching arrangement comprising four switches in an H-bridge configuration, and wherein the switching arrangements of one battery string is controlled by a string controller, the method comprising the steps of:
by a first battery string controller, controlling switches of the switching arrangements of the first battery string according to frequency and voltage references thereby establishing a first phase AC output voltage of the first battery string,
by a second battery string controller establish a measurement of the first phase AC output voltage and establish a second phase AC output voltage displaced with 120 degrees compared to the first phase AC output voltage, by controlling the switches of the switching arrangement of the second battery string, and
by a third battery string controller establish a measurement of the first or second phase AC output voltage and establish a third phase AC output voltage displaced with 120 degrees compared to the first and to the second phase AC output voltage, by controlling the switches of the switching arrangement of the third battery string,
wherein a load is disconnected from the high power uninterruptible power supply when the three phased AC voltage output is established and wherein the load is connected to the high power uninterruptible power supply by means of switching device after the three phased AC voltage output is established, wherein the connection of the load to the high power uninterruptible power supply is made by ramping up the three phased AC voltage output.

22. The method according to claim 21, the method is implemented in the high power uninterruptible power supply further comprising:
an electric cabinet comprising said first, second and third battery string, each battery string associated individually with a switching arrangement wherein the switching arrangements each comprises four switches configured in an H-bridge and are configured to include the associated battery module in or exclude the associated battery module from the battery string and thereby to establish a current path through the battery string, including at least two battery module of the plurality of battery modules,
a first uninterruptible power supply output electrically connectable to a first load of the stationary electric system,
a second uninterruptible power supply output electrically connected so as to facilitate supplying a load with the voltage of at least one battery module,
a string controller configured to receive a control reference and based thereon configured for controlling the operation state of switches of the switching arrangements and thereby the current path through the battery strings and thereby the voltage level and current direction of the first and second uninterruptible power supply output.

23. A high power uninterruptible power supply connectable to a stationary electric system, the high power uninterruptible power supply comprising:
an electric cabinet comprising a battery string, the battery string comprising a plurality of battery modules each associated individually with a switching arrangement wherein the switching arrangements each comprises four switches configured in an H-bridge and are configured to include the associated battery module in or exclude the associated battery module from the battery string and thereby to establish a current path through the battery string, including at least two battery module of the plurality of battery modules,
a first uninterruptible power supply output electrically connected to a first end of the battery string and which is connectable to a first load of the stationary electric system,
a second uninterruptible power supply output electrically connected to the battery string so as to facilitate supplying a load with the voltage of at least one battery module,
a string controller configured to receive a control reference and based thereon configured for controlling the operation state of switches of the switching arrangements and thereby the current path through the battery string and thereby the voltage level and current direction of the first and second uninterruptible power supply output,
wherein the string controller of a battery string, being a first battery string, supplying a single phased AC load is configured to, together with a string controller of a second battery string taking over the supply are configured to control a battery string swap according to the following steps:
starting up the second battery string
synchronizing output voltage of the first and second battery strings
connecting the second battery string to the AC load, and disconnecting the first battery string from the AC load.

* * * * *